(12) United States Patent
Matsuda et al.

(10) Patent No.: US 10,755,134 B2
(45) Date of Patent: Aug. 25, 2020

(54) GENERATION OF TRAINING DATA FOR OBJECT-SORTING WORK BASED ON A DIFFERENCE BETWEEN FEATURE AMOUNTS OF CAPTURED OBJECT IMAGES

(71) Applicant: FUJITSU LIMITED, Kawasaki-shi, Kanagawa (JP)

(72) Inventors: Yuji Matsuda, Kawasaki (JP); Kentaro Tsuji, Kawasaki (JP); Eigo Segawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 114 days.

(21) Appl. No.: 16/121,965

(22) Filed: Sep. 5, 2018

(65) Prior Publication Data

US 2019/0073557 A1    Mar. 7, 2019

(30) Foreign Application Priority Data

Sep. 7, 2017  (JP) ................................. 2017-172495

(51) Int. Cl.
*G06K 9/46* (2006.01)
*G06Q 10/08* (2012.01)
*G06K 9/62* (2006.01)

(52) U.S. Cl.
CPC ......... *G06K 9/4609* (2013.01); *G06K 9/6256* (2013.01); *G06Q 10/087* (2013.01); *G06K 2209/19* (2013.01)

(58) Field of Classification Search
CPC ........................... A01G 9/143; G01N 21/8851

USPC ....... 382/103, 218, 156, 159, 118, 167, 168; 209/3.3, 589, 658
See application file for complete search history.

(56) References Cited

U.S. PATENT DOCUMENTS

2010/0027873 A1    2/2010  Kakuda
2012/0017507 A1*   1/2012  Owens, Jr. ............. A01G 9/143
                                                47/1.01 P
(Continued)

FOREIGN PATENT DOCUMENTS

JP    2001-158373    6/2001
JP    2006-330797    12/2006
(Continued)

*Primary Examiner* — Kiet M Doan
(74) *Attorney, Agent, or Firm* — Fujitsu Patent Center

(57) ABSTRACT

An apparatus includes a memory configured to store training data used for automatically sorting objects. The apparatus acquires a first captured-image that is captured at a first timing before an object-sorting work for sorting objects is performed, and a second captured-image that is captured at a second timing after the object-sorting work has been performed, and extracts, from each of the first captured-image and the second captured-image, a feature amount of an object-image that is an image of an object included in each of the first captured-image and the second captured-image. The apparatus stores, in the memory, as the training data, a first feature amount corresponding to a first object whose object-image is included in both the first captured image and the second captured image, or a second feature amount corresponding to a second object whose object-image is included in only one of the first captured-image and the second captured-image.

8 Claims, 16 Drawing Sheets

(56) References Cited

U.S. PATENT DOCUMENTS

2017/0066597 A1\* 3/2017 Hiroi .................. B65G 15/00
2019/0291141 A1\* 9/2019 Koyanaka ............. B07C 5/342

FOREIGN PATENT DOCUMENTS

JP 2012-026982 2/2012
WO 2008/026562 3/2008

\* cited by examiner

AT TIME T1

AT TIME T2 (=T1 + DT)

AT TIME T4 (=T1 + 3×DT)

AT TIME T5 (=T1 + 4×DT)

AT TIME T6 (=T2 + 4×DT)

FIG. 8

| IMAGE GROUP | OBJECT ID | IMAGE FILE NAME | CAPTURING TIME | FEATURE AMOUNT |
|---|---|---|---|---|
| G1 | 1 | XXX-1.jpg | T1 | PV11 |
| | 2 | XXX-2.jpg | T2 | PV12 |
| | ⋮ | ⋮ | ⋮ | ⋮ |
| G2 | 1 | YYY-1.jpg | T1 | PV21 |
| | 2 | YYY-3.jpg | T3 | PV23 |
| | ⋮ | ⋮ | ⋮ | ⋮ |

| ID | IMAGE FILE NAME | LABEL |
|---|---|---|
| 1 | XXX-1.jpg | (NONE) |
| 2 | XXX-2.jpg | REMOVE |
| 3 | XXX-3.jpg | (NONE) |
| 4 | XXX-4.jpg | (NONE) |
| ⋮ | ⋮ | ⋮ |

| ID | IMAGE FILE NAME | LABEL |
|---|---|---|
| 1 | XXX-1. jpg | NOT REMOVE |
| 2 | XXX-2. jpg | REMOVE |
| 3 | XXX-3. jpg | NOT REMOVE |
| 4 | XXX-4. jpg | NOT REMOVE |
| ⋮ | ⋮ | ⋮ |

| ID | IMAGE FILE NAME | LABEL |
|---|---|---|
| 1 | XXX-1. jpg | NORMAL |
| 2 | XXX-2. jpg | ABNORMAL |
| 3 | XXX-3. jpg | NORMAL |
| 4 | XXX-4. jpg | NORMAL |
| ⋮ | ⋮ | ⋮ |

| ID | FEATURE AMOUNT OF OBJECT ON IMAGE | LABEL |
|---|---|---|
| 1 | PV11 | NORMAL |
| 2 | PV12 | ABNORMAL |
| 3 | PV13 | NORMAL |
| 4 | PV14 | NORMAL |
| ⋮ | ⋮ | ⋮ |

193

GENERATION OF TRAINING DATA FOR OBJECT-SORTING WORK BASED ON A DIFFERENCE BETWEEN FEATURE AMOUNTS OF CAPTURED OBJECT IMAGES

CROSS-REFERENCE TO RELATED APPLICATION

This application is based upon and claims the benefit of priority of the prior Japanese Patent Application No. 2017-172495, filed on Sep. 7, 2017, the entire contents of which are incorporated herein by reference.

FIELD

The embodiments discussed herein are related to generation of training data for object-sorting work based on a difference between feature amounts of captured object images.

BACKGROUND

Object sorting work using an image includes, for example, appearance inspection of products in production lines of various products, removal of foods that are not able to be used in processing performed in factories in which fresh foods are processed, or the like. In sorting work of this type, based on training data including information for an image of an object (a normal article) which has no problem and information for an image of an object (an abnormal article) which has some kind of problem and is to be removed, a computer determines whether or not the objects depicted in the images are to be removed.

In generating training data, a computer (or a human) collects many captured images of an object that is a sorting target and gives a label used for determining, for each image, whether the image is an image obtained by capturing an object of a normal article or an abnormal article. In this case, as the number of images that are collected increases, sorting accuracy increases but, on the other hand, the number of times work of giving a label is performed increases and a work time becomes longer. Specifically, in a case in which a person (a worker) operates an input device to perform work of giving a label, as the number of images increases, a workload of the worker increases. Therefore, in recent years, a method for efficiently generating training data using information included in image data has been proposed.

As a method for generating training data, there is a method in which data that has been manually labeled by a person is prepared for each category and a category of data a label of which is unknown is determined to be a category of data the level of similarity of which is the highest among pieces of data which were labeled (see, for example, Japanese Laid-open Patent Publication No. 2001-158373).

Also, there is a method in which similar images are divided into clusters, based on a feature defined in advance, by learning without a teacher and it is determined, based on to which cluster an image that has been newly input belongs, whether the image is normal or abnormal (see, for example, Japanese Laid-open Patent Publication No. 2006-330797).

Japanese Laid-open Patent Publication No. 2001-158373 and Japanese Laid-open Patent Publication No. 2006-330797 discuss related art.

SUMMARY

According to an aspect of the invention, an apparatus includes a memory configured to store training data used for automatically sorting objects. The apparatus acquires a first captured-image that is captured at a first timing before an object-sorting work for sorting objects is performed, and a second captured-image that is captured at a second timing after the object-sorting work has been performed, and extracts, from each of the first captured-image and the second captured-image, a feature amount of an object-image that is an image of an object included in each of the first captured-image and the second captured-image. The apparatus stores, in the memory, as the training data, a first feature amount corresponding to a first object whose object-image is included in both the first captured image and the second captured image, or a second feature amount corresponding to a second object whose object-image is included in only one of the first captured-image and the second captured-image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a table illustrating contents of a feature amount table;

FIG. 9 is a table illustrating an example of contents of training data;

FIG. 11 is a table illustrating an example of contents of training data that is generated according to the modified example of registration processing;

FIGS. 12A and 12B are tables illustrating still another example of training data;

DESCRIPTION OF EMBODIMENTS

In a case in which training data is generated based on information included in image data, there is a probability that, if a feature that is used as a sorting standard has not been properly set, a wrong label is given and accuracy of determination using training data is reduced. Specifically, in a case where an outer shape, dimensions, color, or the like of an object which has no problem are not unique thereto, it is difficult to generate training data by using only information included in image data.

In an aspect, it is an object of the present disclosure to efficiently generate training data which is training data that is used for object sorting using an image and in which a result of sorting work that has been performed by a person is reflected.

Figure 1:
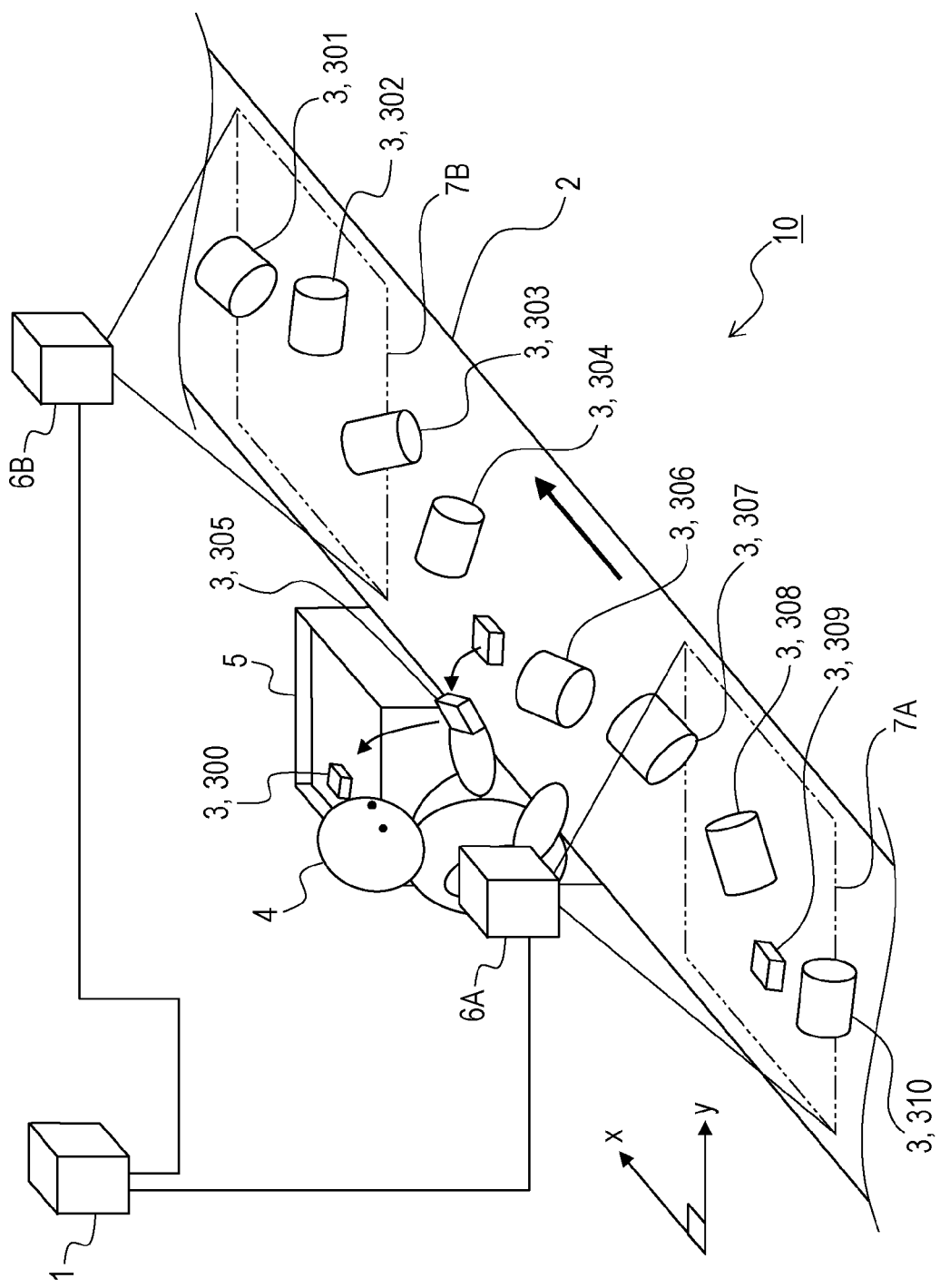
FIG. 1 is a schematic view illustrating an application example of a training data generation device according to an embodiment.

FIG. 1 is a schematic view illustrating an application example of a training data generation device according to an embodiment.

A training data generation device according to this embodiment is, for example, a device that generates training data that is used as a sorting standard when work of sorting each of objects of a plurality of types to an object that satisfies a desired condition or some other object by a machine. In FIG. 1, as an application example of a training data generation device 1, an example in which training data for work of removing a foreign object from a plurality of objects 3 that are conveyed by a belt conveyor 2 is generated is illustrated.

In generating training data by the training data generation device 1, as illustrated in FIG. 1, a work line 10 in which a worker 4 is performing work of sorting the objects 3 (work of removing a foreign object) is used. The objects 3 that are sorting targets in the work line 10 of FIG. 1 include objects 301 to 304, 306 to 308, and 310 each of which has a cylindrical outer shape and objects 300, 305, and 309 each of which has a rectangular parallelepiped outer shape. The worker 4 performs work of sorting each of the objects 3 that are conveyed by the belt conveyor 2 to an object having a cylindrical shape or an object having some other shape. In this case, when the worker 4 finds an object, such as the object 305 having a rectangular parallelepiped shape or the like, the outer shape of which is not a cylindrical shape, from the objects 3 that are conveyed by the belt conveyor 2, the worker 4 picks up the object and puts it into a recovery container 5. Thus, only the objects 301 to 304, 306 to 308, and 301 each of which has a cylindrical shape are conveyed to a downstream side of the worker 4 in a conveyance path of the belt conveyor 2. This type of work is performed in, for example, a factory in which fresh foods are processed, or the like. In the factory in which fresh foods are processed, for example, work of removing, as a foreign object, a food or the like which is not able to be used for processing, among foods that have been stocked, is performed.

In a case in which training data for work of sorting each of the objects 3 that are conveyed by the belt conveyor 2 is generated, the training data generation device 1 acquires, for example, an image captured by a first camera 6A and an image captured by a second camera 6B. The first camera 6A captures a first imaging area 7A located in an upstream side of a work area in which the worker 4 performs work of removing a foreign object in the conveyance path of the belt conveyor 2. On the other hand, the second camera 6B captures a second imaging area 7B located in a downstream side of the work area in the conveyance path. In the first camera 6A, all of the objects 3 that are sorting targets are captured and, in the second camera 6B, only ones of all of the objects 3 that are sorting targets, which have not been removed by the worker 4, are captured. That is, the first camera 6A captures images of a plurality of objects before sorting and the second camera 6B captures only images of objects that have not been removed by the worker 4 after sorting. Therefore, an object sorting standard (training data) based on the images is obtained by determining, for each of the images of the objects 3 that have been captured by the first camera 6A, whether or not an image captured by the second camera 6B also exists, and then, performing sorting. For example, for the object 301 having a cylindrical shape in FIG. 1, an image captured by the first camera 6A and an image captured by the second camera 6B exist. Therefore, the training data generation device 1 registers the images of the object 301 having a cylindrical shape as images of an object that is not to be removed in the training data. On the other hand, for the object 305 having a rectangular parallelepiped shape in FIG. 1, an image captured by the first camera 6A exists but an image captured by the second camera 6B does not exist. Therefore, the training data generation device 1 registers the image of the object 305 having a parallelepiped shape as an image that is to be removed in the training data.

Figure 2:
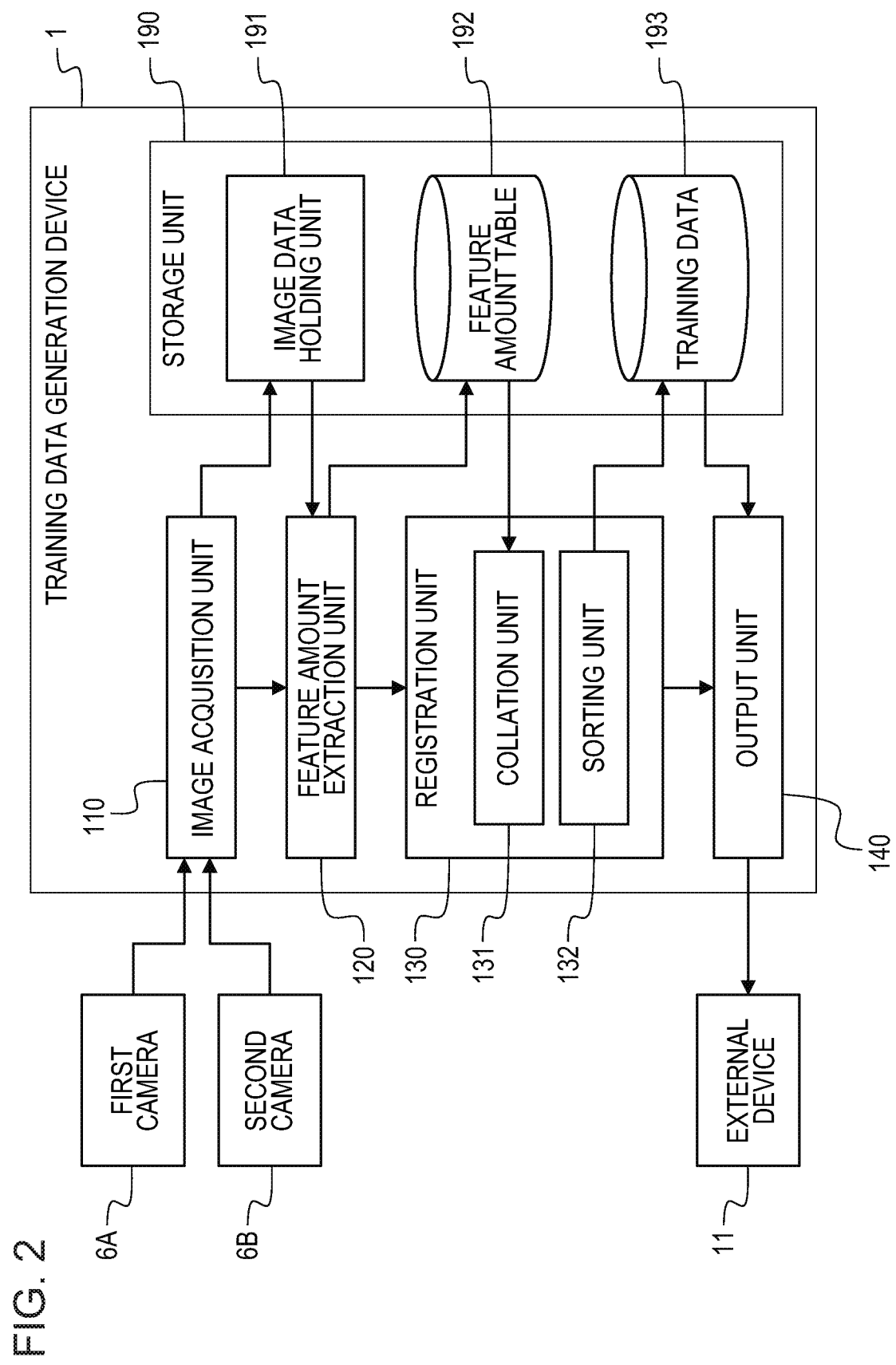
FIG. 2 is a diagram illustrating a functional configuration of a training data generation device according to an embodiment.

FIG. 2 is a diagram illustrating a functional configuration of a training data generation device according to an embodiment.

As illustrated in FIG. 2, the training data generation device 1 of this embodiment includes an image acquisition unit 110, a feature amount extraction unit 120, a registration unit 130, and an output unit 140. Also, the training data generation device 1 includes an image data holding unit 191, a feature amount table 192, and a storage unit 190 that stores various types of information including training data 193.

The image acquisition unit 110 acquires an image captured by the first camera 6A and an image captured by the second camera 6B. Images captured by the first camera 6A are images of a plurality of objects that are sorting targets, which have been captured in a state in which the plurality of objects are not sorted yet. On the other hand, images captured by the second camera 6B are images of only objects that are included in a group after a worker has sorted the plurality of objects in accordance with a predetermined sorting standard by visual observation. That is, the image acquisition unit 110 acquires a first image captured at a first timing before work of sorting the objects is performed and a second image captured at a second timing after the work has been performed. In the following description, the first image captured by the first camera 6A will be referred to as an image before sorting and the second image captured by the second camera 6B will be referred to as an image after sorting. The image acquisition unit 110 stores each of the image before sorting and the image after sorting, which have been acquired, in the image data holding unit 191 of the storage unit 190 in a state in which the corresponding one of the cameras that has captured the image and an capturing time of the image are identified.

The feature amount extraction unit 120 extracts a feature amount of an area in which an object has been imaged in each of the image before sorting and the image after sorting. Hereinafter, an area in which an object has been imaged will be also referred to as an object-image. The feature amount extraction unit 120 detects an area (an object-image) in which an object that is a sorting target has been imaged from each of the image before sorting and the image after sorting and extracts a feature amount for the object. The feature amount extraction unit 120 detects an object depicted in an image in accordance with a known detection method. For example, the feature amount extraction unit 120 determines, based on a difference between a background image captured with no object on the belt conveyor 2 and an object-image that is an object detection target, whether or not an object exists in an acquired image and detects the object. Also, the feature amount extraction unit 120 extracts a feature amount for the object that has been detected from the image in accordance with a known extraction method. For example, the feature amount extraction unit 120 extracts, as a feature amount, a color histogram of a predetermined partial area including an object-image in the image or a gradient histogram of an edge of the object-image in the image. Note that, when a plurality of objects are involved in a single image, the feature amount extraction unit 120 extracts a feature amount for each of the plurality of objects that have been detected from the single image. The feature amount extraction unit 120 stores the feature amount for the object, whose object-image has been extracted from each image, in the feature amount table 192 of the storage unit 190 in association with a capturing time of the image.

The registration unit 130 registers, for each object that has been detected from the image before sorting, information for the object and information that indicates whether or not the object is an object whose object-image is also included in the image after sorting, in the training data 193 of the storage unit 190. The registration unit 130 includes a collation unit 131 and a sorting unit 132. The collation unit 131 collates, for each object that has been detected from the image before sorting, a feature amount for the object, which has been extracted from the image before sorting, and a feature amount for the object, which has been extracted from the image after sorting. For example, the collation unit 131 calculates a distance between the feature amount for an object, whose object-image has been extracted from the image before sorting, and the feature amount for an object, whose object-image has been extracted from the image after sorting, and determines whether or not a combination of the feature amounts, the calculated distance between which is a threshold or less, exists. When a combination of the feature amounts whose distance is the threshold or less exists, the collation unit 131 recognizes that the object that has been detected from the image before sorting is an object whose object-image after sorting also exists. On the other hand, when a combination of the feature amounts whose distance is the threshold or less does not exist, the collation unit 131 recognizes that the object that has been detected from the image before sorting is an object whose object-image after sorting does not exist. The sorting unit 132 registers, for each object that has been detected from the image before sorting, information for the object and information that indicates a collation result (whether or not the object is an object whose object-image after sorting exists) of the collation unit 131 in the training data 193. For example, the sorting unit 132 provides information for an object whose object-image after sorting does not exists, with a label indicating that the object is to be removed from the belt conveyor 2 as the information that indicates the collation result in the collation unit 131. In this case, information for each of a plurality of objects registered in the training data 193 may be identified as information for an object that is to be removed from the belt conveyor 2 or information for an object that is not to be removed, based on whether or not the label has been provided. Also, the sorting unit 132 may be configured to use, for example, as information that indicates the collation result in the collation unit 131, a label indicating that the object is an object whose object-image after sorting exists and a label indicating that the object is an object whose object-image after sorting does not exist.

The output unit 140 outputs the generated training data 193 to an external device 11. The external device 11 may be, for example, a sorting machine that sorts an object by using the training data 193 and may be a server device that provides the training data 193 to a sorting machine.

Figure 3:
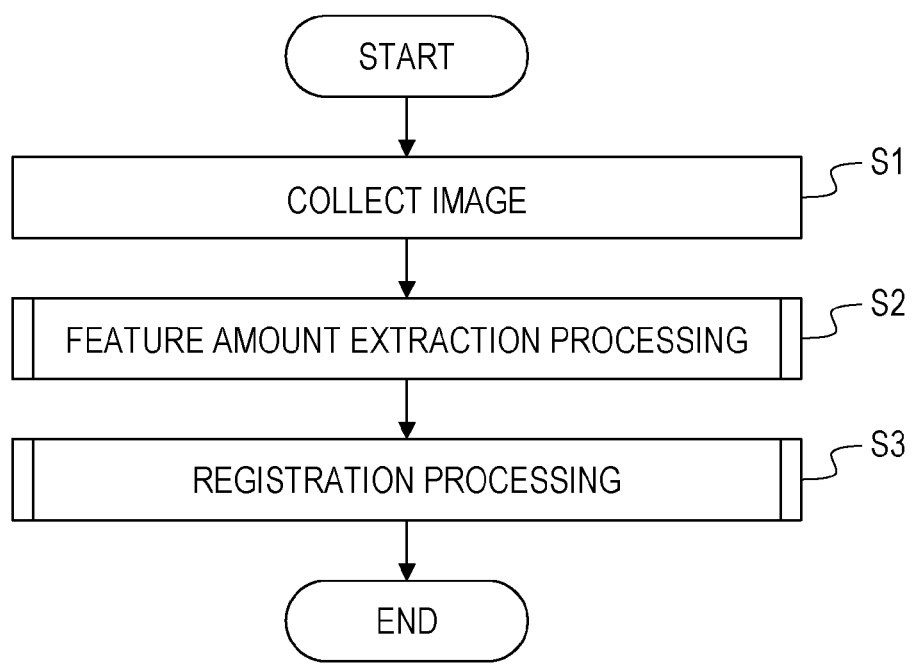
FIG. 3 is a flowchart illustrating processing that is performed by a training data generation device according to an embodiment.

FIG. 3 is a flowchart illustrating processing that is performed by a training data generation device according to an embodiment.

The training data generation device 1 of this embodiment performs processing (Step S1) of collecting images, teacher amount extraction processing (Step S2), and registration processing (Step S3), as illustrated in FIG. 3.

Processing of Step S1 is performed by the image acquisition unit 110. The image acquisition unit 110 acquires an image (an image before sorting) captured by the first camera 6A and an image (an image after sorting) captured by the second camera 6B during work of sorting the plurality of objects 3 which are sorting targets. The image acquisition unit 110, for example, acquires the image before sorting and the image after sorting in predetermined time intervals and stores each of the image before sorting and the image after sorting that have been acquired in the image data holding unit 191 of the storage unit 190 so that each of the cameras, which has captured the corresponding one of the images, and an imaging time thereof are identifiable.

Feature amount extraction processing of Step S2 is performed by the feature amount extraction unit 120. The feature amount extraction unit 120 detects an object that is a sorting target from each of the image before sorting and the image after sorting, and extracts a feature amount for the detected object. The feature amount extraction unit 120 stores the feature amount for the object, which has been extracted, in the feature amount table 192 of the storage unit 190 so that the camera that has captured the image of the object and an imaging time of the image are identifiable.

Registration processing of Step S3 is performed by the registration unit 130. The registration unit 130 collates, for each object that has been detected from the image before sorting, the feature amount for the object and the feature amounts of objects which have been extracted from the image after sorting, and determines whether or not the object is an object whose image after sorting exists. The registration unit 130 calculates a distance (a difference) between the feature amounts that are collated, and determines whether or not the object is an object whose image after sorting exists, based on whether or not there exists a feature amount, among the feature amounts of objects which have been extracted from the image after sorting, whose distance is a threshold or less. When, among the feature amounts of the objects which have been extracted from the image after sorting, there exists a feature amount whose distance from the feature amount for the object detected from the image before sorting is the threshold or less, the registration unit 130 recognizes that the object that has been detected from the image before sorting is an object whose image after sorting exists. Among the objects that have been detected from the image before sorting, the object whose image after sorting exists is an object that has not been removed from the belt conveyor 2 in sorting work of the worker 4 by visual observation. Therefore, when the registration unit 130 has recognized that the object that has been detected from the image before sorting is an object whose image after sorting exists, the registration unit 130 registers, for example, information on the object in the training data 193 without giving a label. On the other hand, when, among the feature amounts of the objects which have been extracted from the image after sorting, there exists no feature amount whose distance from the feature amount for the object that has been detected from the image before sorting is the threshold or less, the registration unit 130 recognizes that the object that has been detected from the image before sorting is an object whose image after sorting does not exist. Among the objects that have been detected from the image before sorting, the object whose image after sorting does not exist is an object that has been removed from the belt conveyor 2 in sorting work of the worker 4 by visual observation. Therefore, when it is recognized that the object that has been detected from the image before sorting is an object whose image after sorting does not exist, the registration unit 130 gives, for example, information on the object a label indicating that the object is to be removed and registers the information in the training data 193.

Note that it is possible to appropriately change timings at which processing of Step S1, processing of Step S2, and processing of Step S3 are performed in the training data generation device 1 of this embodiment. For example, in generating training data by the training data generation device 1, it is possible to perform the processing of Step S1 in a period in which object sorting work is performed and, after the sorting work is terminated, perform the processing of Step S2 and the processing of Step S3. In this case, the training data generation device 1 may be configured to separately perform each of the processing of Step S2 and the processing of Step S3, or also may be configured to pipeline processing of two steps and perform the pipelined processing. Also, the training data generation device 1 may be configured, for example, to pipeline, in generating training data, processing of three steps, that is, the processing of Step S1, the processing of Step S2, and the processing of Step S3, and perform the pipelined processing. Furthermore, the training data generation device 1 may be configured, for example, to pipeline, in generating training data, the processing of Step S1 and the processing of Step S2 and perform the pipelined processing, and thereafter, perform only the processing of Step S3.

The feature amount extraction processing of Step S2 in the flowchart of FIG. 3 is performed by the feature amount extraction unit 120 of the training data generation device 1, as described above. The feature amount extraction unit 120 performs as the feature amount extraction processing, for example, processing in accordance with a flowchart of FIG. 4.

Figure 4:
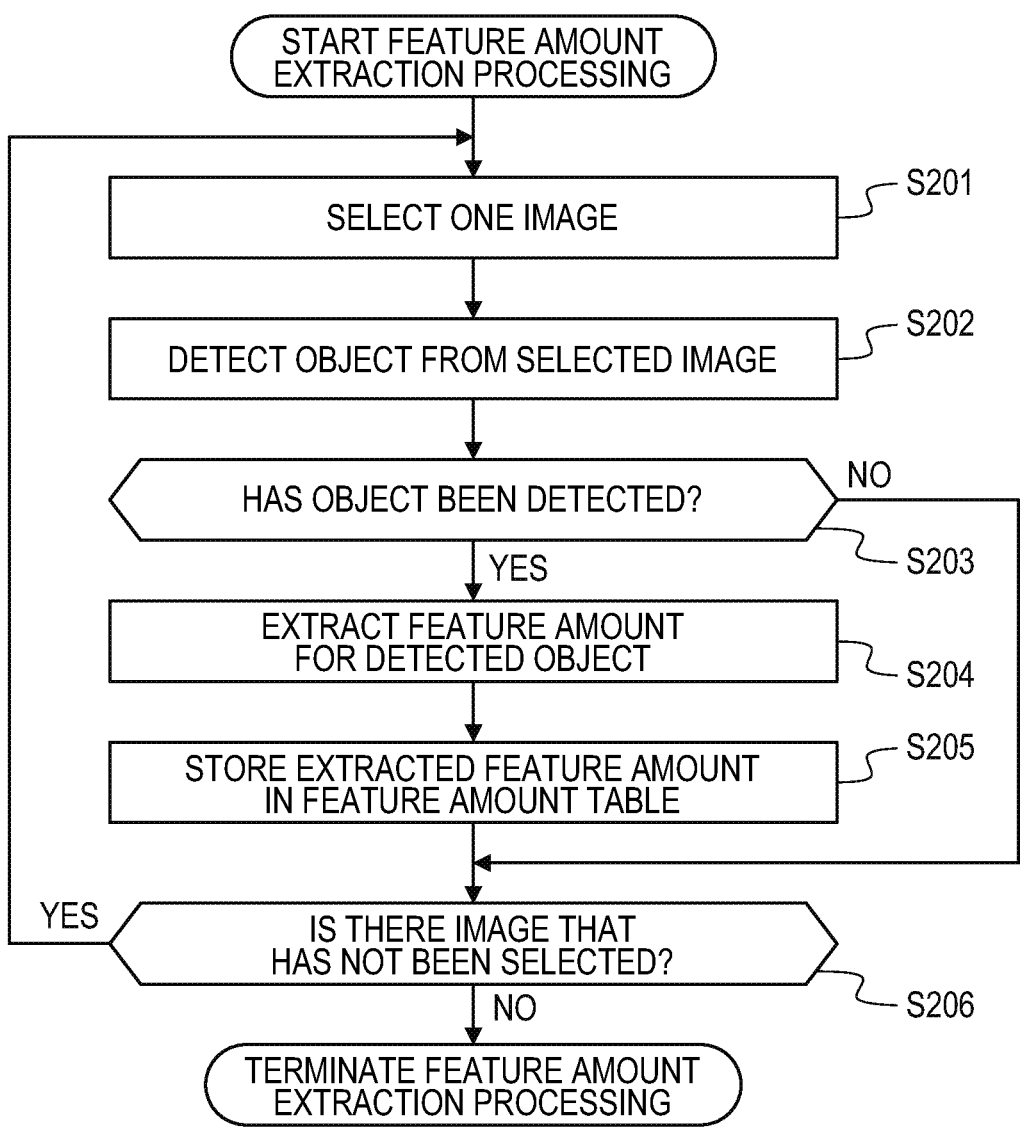
FIG. 4 is a flowchart illustrating contents of feature amount extraction processing.

FIG. 4 is a flowchart illustrating contents of feature amount extraction processing.

As illustrated in FIG. 4, the feature amount extraction unit 120 first selects an image that is held in the image data holding unit 191 (Step S201), and detects an object of a sorting target from the selected image (Step S202). In Step S201, the feature amount extraction unit 120 selects an image from a plurality of images that have been registered in the image data holding unit 191 in accordance with a predetermined selection rule and reads the selected image. Also, in Step S202, the feature amount extraction unit 120 detects an area in the selected image on which an image of the object (an object image) has been captured, in accordance with a predetermined detection method, such as a background difference method or the like. When the feature amount extraction unit 120 detects an area on which an object image has been captured in accordance with the background difference method, the feature amount extraction unit 120 determines whether or not there is an object image, based on a difference between a background image that has been captured with no object existed on the belt conveyor 2 and the image that is currently selected, and detects an area on which an image of an object has been captured. Hereinafter, an area on which an image of an object has been captured will be also referred to as an object image. In this case, the feature amount extraction unit 120 calculates a difference in color information or luminance information between each pixel of the background image and the corresponding pixel of the image that is currently selected and, for example, detects, as an area in which an image of an object has been captured, an area which includes a predetermined number or more of pixels whose difference is a threshold or more.

Next, the feature amount extraction unit 120 determines whether or not an object has been detected from the selected image (Step S203). In Step S203, when an area in which an image of an object has been captured (an object image) is detected from the image that is currently selected, the feature amount extraction unit 120 determines that the object has been detected from the image. When an object has been detected from the selected image (YES in Step S203), the feature amount extraction unit 120 extracts a feature amount for the object from the image that is currently selected (Step S204) and stores the extracted feature amount in the feature amount table 192 (Step S205). In Step S204, the feature amount extraction unit 120 extracts the feature amount for the object from the selected image in accordance with a known extraction method. The feature amount extraction unit 120 extracts, as a feature amount, for example, a color histogram of a predetermined partial area including the object image in the image or a gradient histogram of an edge of the object image in the image. In Step S205, the feature amount extraction unit 120 stores the extracted feature amount in the feature amount table 192, for example, so that a camera that has captured the image that is currently selected and a capturing time of the image is identified. Note that, when a plurality of objects has been detected from the image that is currently selected, for each of the detected objects, the feature amount extraction unit 120 extracts a feature amount and registers the extracted feature amounts in the feature amount table 192.

When the feature amount extraction unit 120 terminates processing of Step S204 and processing of Step S205, the feature amount extraction unit 120 next determines whether or not there is an image that has not been selected (Step S206). Also, when an object has not been detected from the image that is currently selected (NO in Step S203), the feature amount extraction unit 120 omits processing of Step S204 and processing of Step S205 and performs determination of Step S206. When there is an image that has not been selected in the image data holding unit 191 (YES in Step S206), the feature amount extraction unit 120 repeats processing of Step S201 and subsequent steps. Then, when the processing of Step S201 and the subsequent steps has been performed on all of images that are selectable in the image data holding unit 191 (NO in Step S206), the feature amount extraction unit 120 terminates the feature amount extraction processing.

When the feature amount extraction unit 120 terminates the feature amount extraction processing (Step S2), the feature amount extraction unit 120 notifies the registration unit 130 that the processing has been terminated. When this notification is input, the registration unit 130 starts the registration processing (Step S3). The registration unit 130 performs, as the registration processing, for example, processing in accordance with the flowchart of FIG. 5.

Figure 5:
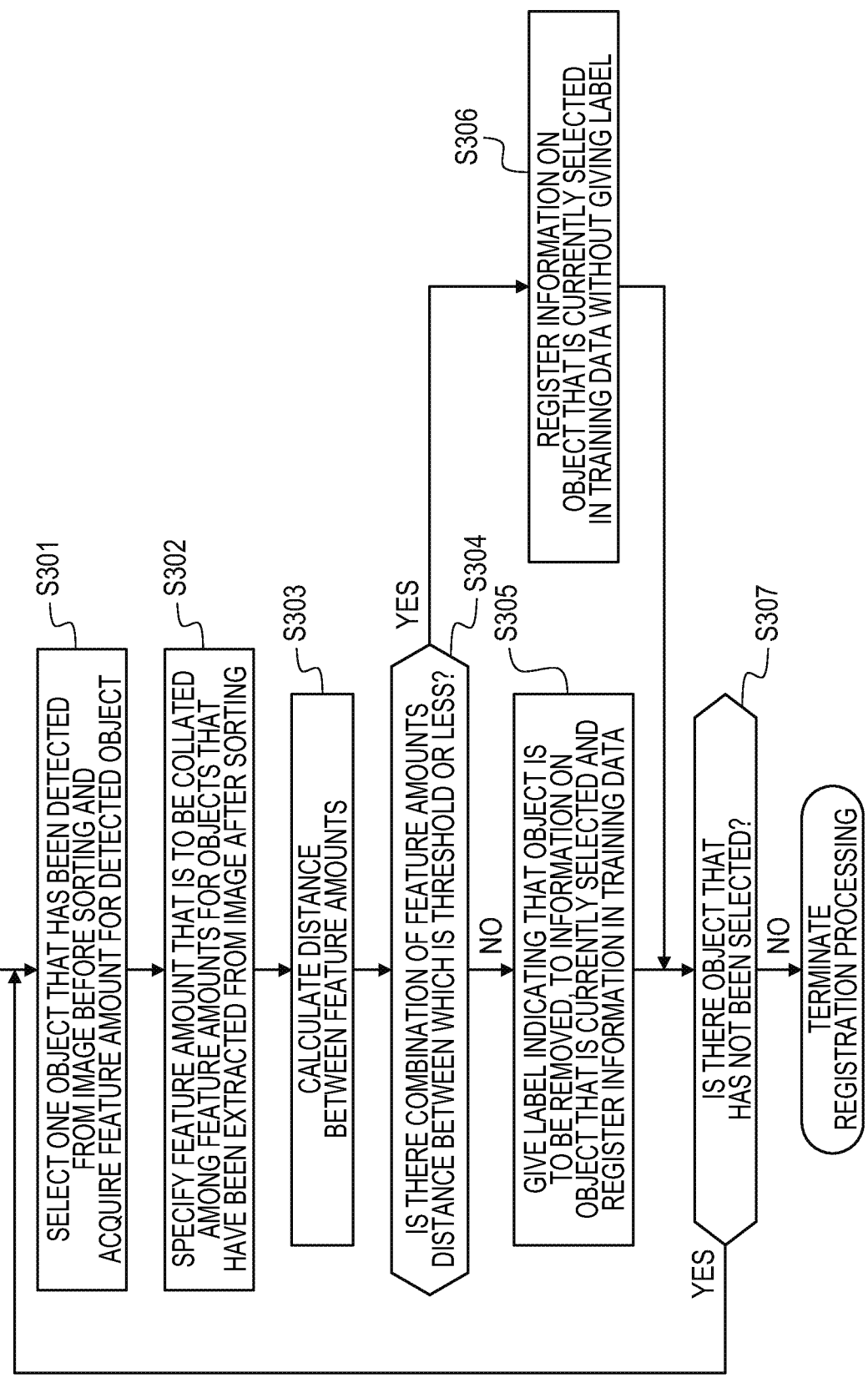
FIG. 5 is a flowchart illustrating contents of registration processing.

FIG. 5 is a flowchart illustrating contents of the registration processing.

As illustrated in FIG. 5, the registration unit 130 first refers to the feature amount table 192, selects one of objects that have been detected from an image before sorting, and acquires a feature amount for the object (Step S301). Processing of Step S301 is performed, for example, by the collation unit 131 of the registration unit 130. In Step S301, the collation unit 131 selects an object whose feature amount is to be acquired in accordance with a predetermined selection rule. For example, the collation unit 131 selects objects one by one in an ascending order of imaging times associated therewith in the feature amount table 192 and reads the feature amount for the selected object.

Next, the registration unit 130 specifies, among feature amounts of objects, which have been extracted from an image after sorting, the feature amount that is to be collated with the feature amount for the object which has been read in Step S301 (Step S302). Processing Step S302 is performed by the collation unit 131. In Step S302, the collation unit 131, for example, first calculates a time at which the object that has been selected in Step S301 reaches a capturing range of the second camera 6B. The time is calculated, for example, based on a capturing time associated with the object that is currently selected, a distance from a capturing range 7A of the first camera 6A to a capturing range 7B of the second camera 6B, and moving speed of the object on the belt conveyor 2. Thereafter, the collation unit 131 specifies an image after sorting captured in a predetermined time range including the calculated time, and specifies, as a feature amount that is to be collated, a feature amount for an object that has been extracted from the image after sorting.

Next, the registration unit 130 calculates a distance between the feature amount for the object that is currently selected, which has been extracted from the image before sorting, and the feature amount for an object, which has been extracted from the image after sorting (S303). Processing of Step S303 is performed by the collation unit 131. The collation unit 131 calculates the distance (a difference) between the feature amounts in accordance with a known calculation method. Note that, when a plurality of feature amounts of objects have been extracted from the image after sorting, which have been specified in Step S302, the collation unit 131 calculates, for each of the plurality of feature amounts of the objects, which have been specified in Step S302, a distance from the feature amount for the object which has been extracted from the image before sorting.

Next, the registration unit 130 determines whether or not there is a combination of the feature amounts distance between which is a threshold or less (Step S304). Determination of Step S304 is performed, for example, by the collation unit 131. When there is no combination of the feature amounts the distance between which is the threshold or less, there is no object, among objects that have been detected from the image after sorting, which corresponds to the selected object among objects that have been detected from the image before sorting. That is, when there is no combination of the feature amounts the distance between which is the threshold or less, the object that currently selected from among objects that have been detected from the image before sorting is an object that has been removed by sorting work. Therefore, when there is no combination of the feature amounts the distance between which is the threshold or less (NO in Step S304), the registration unit 130 gives a label indicating that the object is to be removed, to information on the object which is currently selected from among objects that have been detected from the image before sorting, and registers the information in the training data 193 (Step S305). On the other hand, when there is a combination of the feature amounts the distance between which is the threshold or less (YES in Step S304), the registration unit 130 registers the information on the object, which is currently selected from among the objects that have been detected from the image before sorting, in the training data 193 without giving the label (Step S306). Processing of Step S305 and processing of S306 are selectively performed by the sorting unit 132. When the object (that is, an object that is a target of registration in the training data 193), which is currently selected from among objects that have been detected from the image before sorting, is an object whose image after sorting also exists, the sorting unit 132 registers the information on the object in the training data 193 without giving the label. On the other hand, when the object that is currently selected is an object whose image after sorting does not exist, the sorting unit 132 gives the label to the information on the object, and registers the information in the training data 193.

When the processing of Step S305 or the processing S306 is terminated, the registration unit 130 determines whether or not there is an object, among objects that have been detected from the image before sorting, which has not been selected (Step S307). Determination of Step S307 is performed, for example, by the collation unit 131. When there is an object that has not been selected (YES in Step S307), the registration unit 130 repeats processing of Step S301 and subsequent steps. Then, when the processing of S301 and subsequent steps has been performed on all of the objects that are selectable (NO in Step S307), the registration unit 130 terminates the registration processing.

After the registration processing is terminated, the training data generation device 1 performs processing of outputting the generated training data 193 to the external device 11, or the like.

As has been described above, the training data generation device 1 of this embodiment generates training data, based on feature amounts of objects that have been detected from the image before sorting captured before object sorting work is performed, and feature amounts of objects that have been detected from the image after sorting captured after the sorting work has been performed. In this case, the training data generation device 1 determines, for each object that has been detected from the image before sorting, whether or not an image of the object after sorting exists, based on the feature amounts of objects which have been extracted from the image before sorting, and the feature amounts of objects which have been extracted from the image after sorting. Then, in registering information for the object whose image after sorting does not exist in the training data 193, the training data generation device 1 gives the label indicating that the object is to be removed from the belt conveyor 2 in sorting work to the information and registers the information. That is, in registering the information for the object in the image before sorting in the training data 193, the training data generation device 1 of this embodiment automatically gives the label. Therefore, in detecting an object that is a sorting target from each of a plurality of images and generating the training data 193, a workload of an operator is reduced, as compared to a case in which the operator (the worker 4) operates an input device and performs work of giving the label to each object.

FIG. 6A to FIG. 6E are diagrams illustrating an image collection method.

Figure 6A:
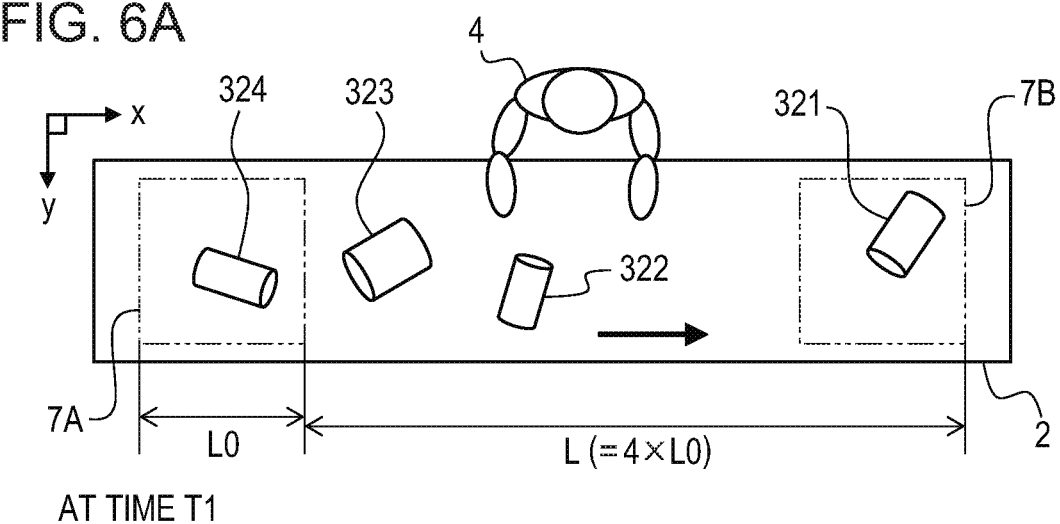
FIG. 6A to FIG. 6E are diagrams illustrating an image collection method.

FIG. 6A illustrates an example of the objects 3 that exist on the belt conveyor 2 at a time T1 and the imaging ranges 7A and 7B. The belt conveyor 2 operates such that the objects 3 move in an x direction (a right direction). That is, in FIG. 6A, a left side of the worker 4 is an upstream side of the belt conveyor 2 and a right side thereof is a downstream side thereof. Therefore, the imaging range 7A of the first camera 6A that captures an image before sorting is on the left side of the worker 4 and the imaging range 7B of the second camera 6B that captures an image after sorting is on the right side of the worker 4. In this case, a distance L between the imaging range 7A of the first camera 6A and the imaging range 7B of the second camera 6B is, for example, an integer multiple (four-fold in FIG. 6A) of a dimension L0 in a conveyance direction of the objects 3 in the imaging range 7A. Thus, by capturing each of the imaging ranges 7A and 7B by the corresponding one of the first camera 6A and the second camera 6B each time the belt conveyor 2 moves by a moving amount that corresponds to the dimension L0 in the conveyance direction in the imaging range 7A, it is enabled to acquire images with no break therebetween. That is, each of the imaging ranges 7A and 7B is captured by the corresponding one of the first camera 6A and the second camera 6B each time a time DT, which is taken for the objects on the belt conveyor 2 to move by a distance that corresponds to the dimension L0 of the imaging range 7A, has elapsed, and thereby, it is possible to reduce failure of detection of an object.

For example, it is assumed that, at the time T1, the imaging range 7A was captured by the first camera 6A and the imaging range 7B was captured by the second camera 6B. At the time, an object 324 existed in the imaging range 7A of the first camera 6A, and therefore, an image captured by the first camera 6A at the time T1 includes the object 324. Therefore, in the case in which the imaging range 7A was captured by the first camera 6A at the time T1, the training data generation device 1 acquires an image including the object 324, which was captured by the first camera 6A, as one of the images before sorting. Also, in the case in which the imaging range 7B was captured by the second camera 6B at the time T1, the training data generation device 1 acquires an image including an object 321, which was captured by the second camera 6B, as one of the images after sorting.

Figure 6B:
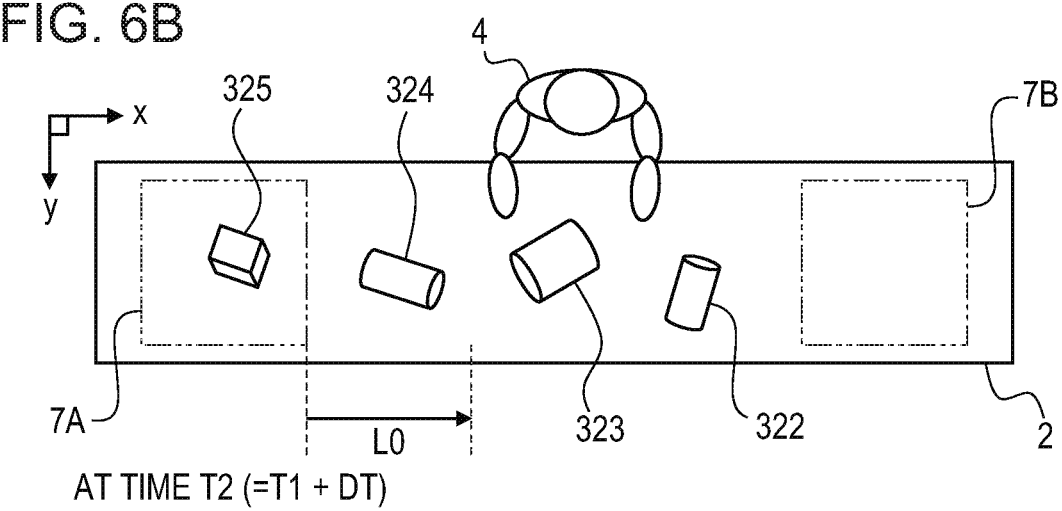

At a time T2 (=T1+DT) at which the time DT has elapsed since the time T1, as illustrated in FIG. 6B, each of objects 322 to 324 on the belt conveyor 2 moves by the dimension L0 in the x direction (toward the right side). In this case, the time DT (=T2−T1) is a time that is taken for objects on the belt conveyor 2 to move by a moving amount that corresponds to the dimension L0 of the imaging range 7A. That is, the objects on the belt conveyor 2 in FIG. 6B are located in positions shifted from corresponding positions in FIG. 6A toward the right side by one imaging range.

At the time T2, an object 325 that is a new sorting target moves into the imaging range 7A of the first camera 6A. Therefore, in a case in which the imaging range 7A was captured by the first camera 6A at the time T2, the training data generation device 1 acquires an image including the object 325 as one of the images before sorting. Note that the object 325 has a rectangular parallelepiped outer shape, unlike the other objects 322 to 324 each of which has a cylindrical shape. That is, the object 325 is an object (a foreign object) that is to be removed by the worker 4. Also, in a case in which the imaging range 7B was captured by the second camera 6B at the time T2, the training data generation device 1 acquires an image in which an object is not present as one of the images after sorting.

Figure 6C:
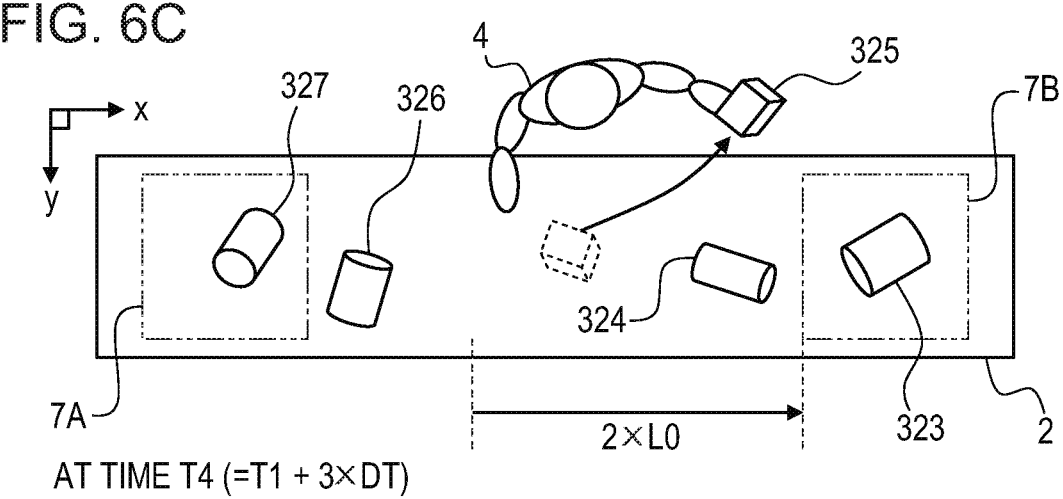

At a time T4 (=T1+3×DT) at which a time 2×DT has elapsed since the time T2, as illustrated in FIG. 6C, the object 325 having a rectangular parallelepiped shape reaches a front of the worker 4. At the time, the worker 4 recognizes the object 325 that passes in front of the worker 4 as an object that is to be removed, picks up the object 325 from the belt conveyor 2, and puts the object 325 in a recovery container (not illustrated). In a case in which the imaging range 7A was captured by the first camera 6A at the time T4, the training data generation device 1 acquires an image including an object 327 as one of the images before sorting. Also, in a case in which the imaging range 7B was captured by the second camera 6B at the time T4, the training data generation device 1 acquires an image including the object 323 as one of the images after sorting.

Figure 6D:
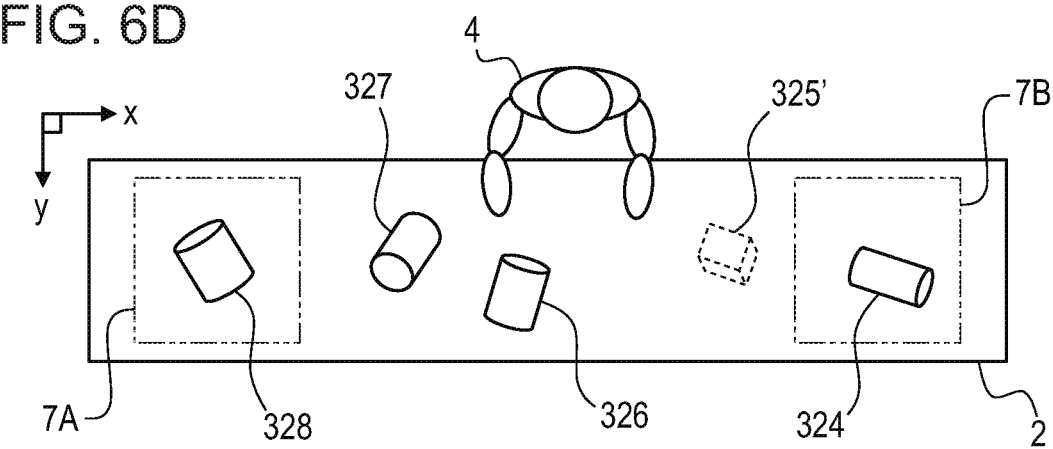

Then, at a time T5 (=T1+4×DT) at which the time DT has elapsed since the time T4, as illustrated in FIG. 6D, the object 324 on the belt conveyor 2 reaches the imaging range 7B of the second camera 6B. The object 324 is an object included in the image captured by the first camera 6A at the time T1. In a case in which the imaging range 7B was captured by the second camera 6B at the time T5, the training data generation device 1 causes an image including the object 324 to be input as one of the images after sorting to the training data generation device 1. Also, in a case in which the imaging range 7A was captured by the first camera 6A at the time T5, the training data generation device 1 acquires an image including an object 328 as one of the images before sorting.

Figure 6E:
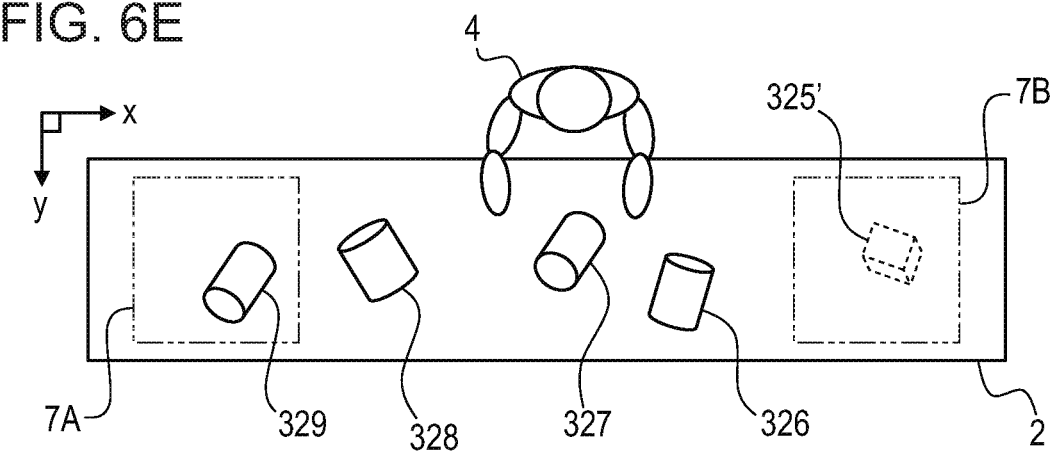

Furthermore, at a time T6 (=T2+4×DT) at which only the time DT has elapsed since the time T5, as illustrated in FIG. 6E, a partial area 325' on the belt conveyor 2 in which the object 325 existed reaches the imaging range 7B of the second camera 6B. Before the object 325 reaches the imaging range 7B, the object 325 has been removed from the belt conveyor 2 by the worker 4. Therefore, no object exists in the imaging range 7B at the time T6. Accordingly, in a case in which the imaging range 7B was captured by the second camera 6B at the time T6, the training data generation device 1 acquires an image in which no object exists as one of the images after sorting. Also, in a case in which the imaging range 7A was captured by the first camera 6A at the time T6, the training data generation device 1 acquires an image including an object 329 as one of the images before sorting.

Thereafter, the training data generation device 1 continues to acquire images captured by the first camera 6A and the second camera 6B each time the time DT has elapsed. Then, when images of a predetermined number have been acquired, the training data generation device 1 terminates the processing of Step S1 in which images are collected. When the training data generation device 1 terminates the processing of Step S1, a plurality of images that have a relationship for imaging time, which is, for example, illustrated in FIG. 7, is stored in the training data generation device 1.

Figure 7:
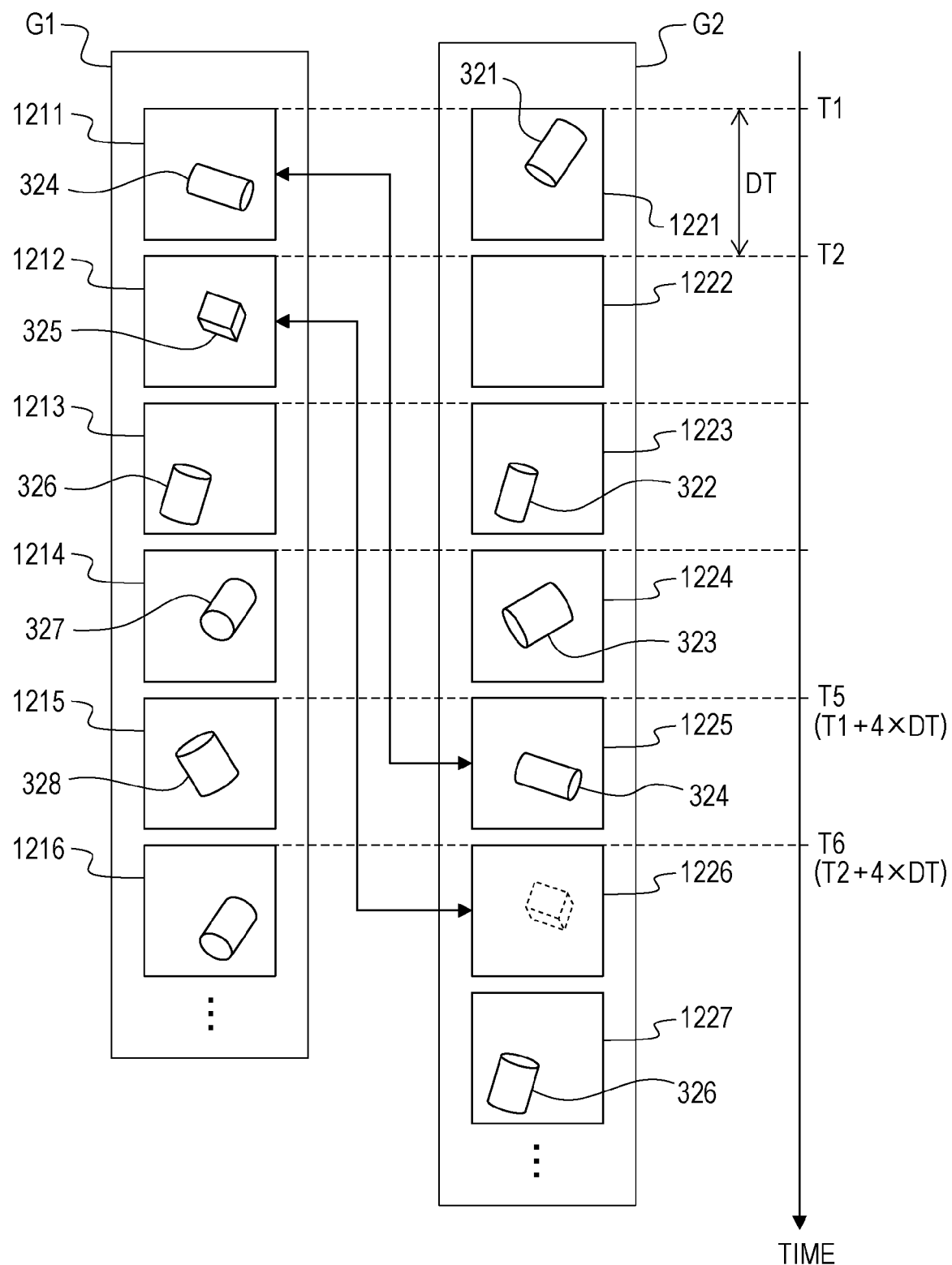
FIG. 7 is a diagram illustrating images that have been collected by a training data generation device.

FIG. 7 is a diagram illustrating images that have been collected by a training data generation device.

The images that have been acquired (collected) from the first camera 6A and the second camera 6B by the training data generation device 1 are stored in the image data holding unit 191 of the training data generation device 1. In this case, as illustrated in FIG. 7, a first image group G1 that is a set of images before sorting and a second image group G2 that is a set of images after sorting are stored in the image data holding unit 191. Each of the images before sorting included in the first image group G1 and the images after sorting included in the second image group G2 is associated with information indicating the capturing time.

For example, an image 1211 of the first image group G1 is an image captured by the first camera 6A at the time T1 illustrated in FIG. 6A. Therefore, an image of the object 324 that existed in the imaging range 7A at the time T1 is included in the image 1211. On the other hand, an image 1221 of the second image group G2 is an image captured by the second camera 6B at the time T1. Therefore, an image of the object 321 that exited in the imaging range 7B at the time T1 is included in the image 1221.

Also, an image 1212 of the first image group G1 is an image captured by the first camera 6A at the time T2 illustrated in FIG. 6B. Therefore, an image of the object 325 having a rectangular parallelepiped shape, which existed in the imaging range 7A at the time T2, is included in the image 1212. On the other hand, an image 1222 of the second image group G2 is an image captured by the second camera 6B at the time T2. Therefore, no images of objects are included in the image 1222.

Also, an image 1225 in the second image group G2 is an image captured by the second camera 6B at the time T5 illustrated in FIG. 6D. The time T5 is a time at which the object 324 that existed in the imaging range 7A of the first camera 6A at the time T1 reaches the imaging range 7B of the second camera 6B. Then, because the outer shape of the object 324 is a cylindrical shape, the worker 4 recognizes that the object 324 is an object that is not to be removed and is caused to pass through to the downstream side of the belt conveyor 2. Therefore, an image of the object 324 that was captured by the first camera 6A at the time T1 is included in the image 1225 that was captured by the second camera 6B at the time T5.

Also, an image 1226 of the second image group G2 is an image captured by the second camera 6B at the time T6 illustrated in FIG. 6E. The time T6 is a time at which the object that existed in the imaging range 7A of the first camera 6A at the time T2 reaches the imaging range 7B of the second camera 6B. However, the object 325 that existed in the imaging range 7A at the time T2 (in other words, the object 325 whose image is included in the image 1212 that was captured by the first camera 6A at the time T2) does not have a cylindrical outer shape. Therefore, the worker 4 removes the object 325 that moves in front of the worker 4 from the belt conveyor 2, as illustrated in FIG. 6C. Therefore, an image of the object 325 is not included in the image 1226 that was captured by the second camera 6B at the time T6.

The training data generation device 1 of this embodiment collects the first image group G1 and the second image group G2 illustrated in FIG. 7, and then, performs processing of extracting a feature amount for an object from each object image included in the collected image groups G1 and G2. The training data generation device 1 performs, for example, processing in accordance with the flowchart of FIG. 4 as processing of extracting a feature amount for an object. For each collected image, the training data generation device 1 detects an object, for example, by a background difference method and extracts a feature amount for the object that has been detected. The training data generation device 1 stores the feature amount for the object, which has been extracted from the image, in the feature amount table 192.

FIG. 8 is a diagram illustrating contents of a feature amount table.

In FIG. 8, an example of the feature amount table 192 is illustrated. Image groups G1 and G2 in the feature amount table 192 of FIG. 8 correspond to the first image group G1 and the second image group G2 of FIG. 7, respectively. An object ID in the feature amount table 192 is represented by a numerical value that identifies each of a plurality of objects that have been detected from a plurality of images included in the corresponding one of the image groups. A file name and a capturing time in the feature amount table 192 are a file name that identifies image data from which an image has been detected and a time at which the image was captured, respectively. A feature amount in the feature amount table 192 is a feature amount for the object that has been extracted from the image from which the object has been detected. The feature amount is, for example, a color histogram of a predetermined partial area including an object in an image or a gradient histogram of an edge of an object in an image.

For example, when it is assumed that the object ID of the object 324 that has been detected from the image 1211 of FIG. 7 is "1", the training data generation device 1 stores a file name XXX-1.jpg, a capturing time T1, and a feature amount PV11 of an object of the image 1211 in the feature amount table 192 in association with the object ID=1 of the image group G1. In this case, assuming that an object ID of the object 325 that has been detected from the image 1212 is "2", the training data generation device 1 stores a file name) XXX-2.jpg, an imaging time T2, and a feature amount PV12 of an object of the image 1212 in the feature amount table 192 in association with the object ID=2 of the image group G1.

Also, when it is assumed that an object ID of the object 321 that has been detected from the image 1221 of FIG. 7 is "1", the training data generation device 1 stores a file name YYY-1.jpg, the imaging time T1, and a feature amount PV21 of an object of the image 1221 in the feature amount table 192 in association with the object ID=1 of the image group G2.

In this case, if it is assumed that an image from which the feature amount extraction unit 120 detects an object in Step S201 of FIG. 4 is time-sequentially selected for each image group, an image that is selected next to the image 1221 is the image 1222 that was captured by the second camera 6B at the time T2. However, as illustrated in FIG. 7, no image of an object is included in the image 1222. Therefore, even when the feature amount extraction unit 120 performs processing of detecting an object from the image 1222 by a background difference method or the like, an object is not detected. Accordingly, the feature amount extraction unit 120 omits processing of extracting a feature amount for an object from the image 1222 and next performs processing of detecting an object from an image 1223 that was captured by the second camera 6B at the time T3. As illustrated in FIG. 7, an image of the object 322 is included in the image 1223. Therefore, the feature amount extraction unit 120 detects an area in which the object 322 was captured from the image 1223 and extracts a feature amount for the object 322. Accordingly, the training data generation device 1 associates a file name YYY-3.jpg, an imaging time T3, and a feature amount PV23 of an object of the image 1223 with the object ID=2 of the image group G2 in the feature amount table 192.

When feature amount extraction processing on collected images is terminated and the feature amount table 192 is obtained, the training data generation device 1 performs registration processing in which an object that has been detected from an image before sorting is sorted and is registered in the training data 193, based on the feature amount table 192. In the registration processing, for each object that has been detected from the image before sorting, the registration unit 130 of the training data generation device 1 collates a feature amount for the object, which has been extracted from the image before sorting, and a feature amount for the object, which has been extracted from an image after sorting. In this case, as the number of feature amounts of objects which are to be collated increases, a processing load of the training data generation device 1 increases. Therefore, in the training data generation device 1 of this embodiment, when an object that has been detected from an image before sorting is selected, based on a capturing time of the image from which the object has been detected and moving speed of objects on the belt conveyor 2, a capturing time of the image in which a feature amount for the object that is to be collated has been extracted is narrowed. For example, in the examples of FIG. 6A to FIG. 6E and FIG. 7, a time taken for an object that was captured by the first camera 6A to reach the imaging range 7B of the second camera 6B is 4×DT. Therefore, if the object 324 that has been detected from the image 1211 of FIG. 7 has been selected, the registration unit 130 specifies a feature amount for an object that has been detected from an image that was captured in a predetermined time range including a time at which the time 4×DT has elapsed since the capturing time T1 of the image 1211 as a feature amount that is to be collated. For example, the registration unit 130 specifies a feature amount for an object, which has been extracted from an image that was captured by the second camera 6B in a time range of ±DT a center of which is the time T5 at which the time 4×DT has elapsed since the capturing time T1, that is, a period from the time T4 to the time T6, as a feature amount that is to be collated. In this case, the registration unit 130 specifies a feature amount for the object 323, which has been extracted from an image 1224 that was captured at the time T4, and a feature amount for the object 324, which has been extracted from the image 1225 that was captured at the time T5, as feature amounts that are to be collated.

After specifying a feature amount that is to be collated, the registration unit 130 calculates a distance between a feature amount for an object, which has been extracted from an image before sorting, and a feature amount for an object, which has been extracted from an image after sorting. In this case, if the feature amount that has been extracted from the image after sorting is a feature amount that has been extracted from the captured image of the object that has been detected from the image before sorting, the distance between the feature amounts is small. For example, a feature amount for the object 324, which has been extracted from the image 1211 of FIG. 7, and a feature amount for the object 324, which has been extracted from the image 1225, are substantially the same value, and therefore, a distance between the two feature amounts is very small. On the other hand, a difference between the feature amount for the object 324, which has been extracted from the image 1211 of FIG. 7, and a feature amount for the object 323, which has been extracted from the image 1224, is large, and therefore, a distance between the two feature amounts is large. Accordingly, a threshold is set based on a distance between two feature amounts of the same object, and thereby, the registration unit 130 is able to determine that the object is an object that is not to be removed if the distance is the threshold or less.

Also, when the object 325 that has been detected from the image 1212 of FIG. 7 is selected, the registration unit 130 specifies a feature amount for an object, which has been extracted from an image that was captured by the second camera 6B in a period from the time T5 to the time T7, as a feature amount that is to be collated. However, the object 325 that has been detected from the image 1212 has been removed by the worker 4 because the outer shape of the object 325 is not a cylindrical shape and a captured image of the object 325 after sorting does not exist. Therefore, feature amounts that are to be collated with the feature amount for the object 325 that has been detected from the image 1212 is a feature amount for the object 324 and a feature amount for an object 326 each of which has a different outer shape from that of the object 325. In this case, a value of each of a distance between the feature amount for the object 325 and the feature amount for the object 324 and a distance between the feature amount for object 325 and the feature amount for the object 326 is large. Accordingly, the registration unit 130 determines that the object 325 that has been detected from the image 1212 is an object that is to be removed.

In the above-described manner, for each object that has been detected from an image before sorting, the registration unit 130 of the training data generation device 1 collates feature amounts to determine whether or not the object is an object that is to be removed, and registers information for the object and information that indicates a determination result, in the training data 193.

FIG. 9 is a table illustrating an example of contents of training data.

In FIG. 9, an example of the training data 193 when registration processing in accordance with the flowchart of FIG. 5 has been performed in the registration unit 130 is shown. An ID in the training data 193 is a value identifying an object that has been registered. An image file name in the training data 193 is a file name identifying image data from which the object has been detected. A label in the training data 193 is information indicating whether or not the object is to be removed at the time of sorting, where "(NONE)" indicates that the label has not been given. In the flowchart of FIG. 5, among objects that have been detected from an image before sorting, an object having a feature amount, whose distance from any one of the feature amounts of objects extracted from an image after sorting is not a threshold or less, is given a label indicating that the object is to be removed (Step S305). On the other hand, in a case where there exists an object, among the objects that have been detected from the image before sorting, which has a feature amount whose distance from one of the feature amounts of objects extracted from an image after sorting is the threshold or less, the object is an object that is not to be removed, and therefore, is not given the label (Step S306).

If it is assumed that an object of ID=1 in the training data 193 is the object 324 that has been detected from the image 1211 of FIG. 7, the registration unit 130 calculates a distance between a feature amount for object 324, which has been extracted from the image 1211, and a feature amount for the object 324, which has been extracted from the image 1225. In this case, the distance between the feature amounts is the threshold or less, and therefore, the registration unit 130 registers information on the object 324 in the training data 193 without giving the label thereto (Step S306).

Also, in this case, if it is assumed that an object of ID=2 in the training data 193 is the object 325 that has been detected from the image 1212 of FIG. 7, a captured image of the object 325 does not exist among images after sorting, which are included in the second image group G2. Therefore, a distance between a feature amount for the object 325, which has been extracted from the image 1212, and any one of the feature amounts of objects extracted from an image after sorting, is larger than the threshold. Accordingly, the registration unit 130 gives the label indicating that the object is to be removed, to information on the object 325, and registers the information on the object 325 in the training data 193 (Step S305).

As described above, in the training data generation device 1 of this embodiment, information on an object, among objects that have been detected from an image before sorting, whose image after sorting does not exist, is given a label indicating that the object is to be removed, and the information is registered in the training data 193. Thus, a computer or a person that refers to the training data 193 is able to determine that an object that has not been given the label is an object that is not to be removed.

As has been described above, the training data generation device 1 of the embodiment determines, based on a feature amount for an object which has been detected from an image before sorting, and feature amounts of objects which have been extracted from an image after sorting, whether or not the object that has been detected from the image before sorting has been removed by sorting work. Then, the training data generation device 1 registers, along with information on the object that has been detected from the image before sorting, information indicating whether or not the object is to be removed by sorting work in accordance with the determination result, in the training data 193. In the case, if manual object sorting work has been performed by a person, the training data generation device 1 is able to generate, in parallel with the sorting work, the training data 193 to which a sorting standard for sorting by a person is reflected and cause the storage unit 190 to store the generated training data 193. Therefore, with the training data generation device 1 of the embodiment, as compared to a case where, in registering information on an object that is a sorting target in the training data 193, information (a label) indicating whether or not an object is to be removed is given manually by a worker, a work load of the worker is reduced. Also, the training data generation device 1 of the embodiment determines, based on a feature amount for an object which has been extracted from an image before sorting, and feature amounts of objects which has been extracted from an image after sorting, whether or not the object is to be removed, and gives information indicating the determination result. Therefore, with the training data generation device 1 of this embodiment, it is possible to efficiently generate the training data 193. Furthermore, only the images of objects that remain on the belt conveyor 2 after the worker 4 has sorted the objects 3 by visual observation, are included in the image after sorting, which is acquired by the training data generation device 1. When such sorting of the worker 4 by visual observation is preformed, it is possible to find an object with a slight difference (abnormality) and remove the object, thereby enabling highly accurate sorting. Accordingly, the training data generation device 1 of the embodiment is able to efficiently generate the training data 193 with less errors.

Note that the flowchart of FIG. 4 is merely an example of processing of extracting a feature amount for an object from an image. Also, the flowchart of FIG. 5 is merely an example of processing in which, based on a feature amount for an object, whether or not the object is to be removed at the time of sorting is determined, and information indicating the determination result is registered along with information on the object, in the training data 193. Each of processing of extracting a feature amount and processing of registering information on an object in the training data 193, which are performed by the training data generation device 1, may be appropriately modified within the scope of the embodiment without departing from the gist thereof.

Figure 10:
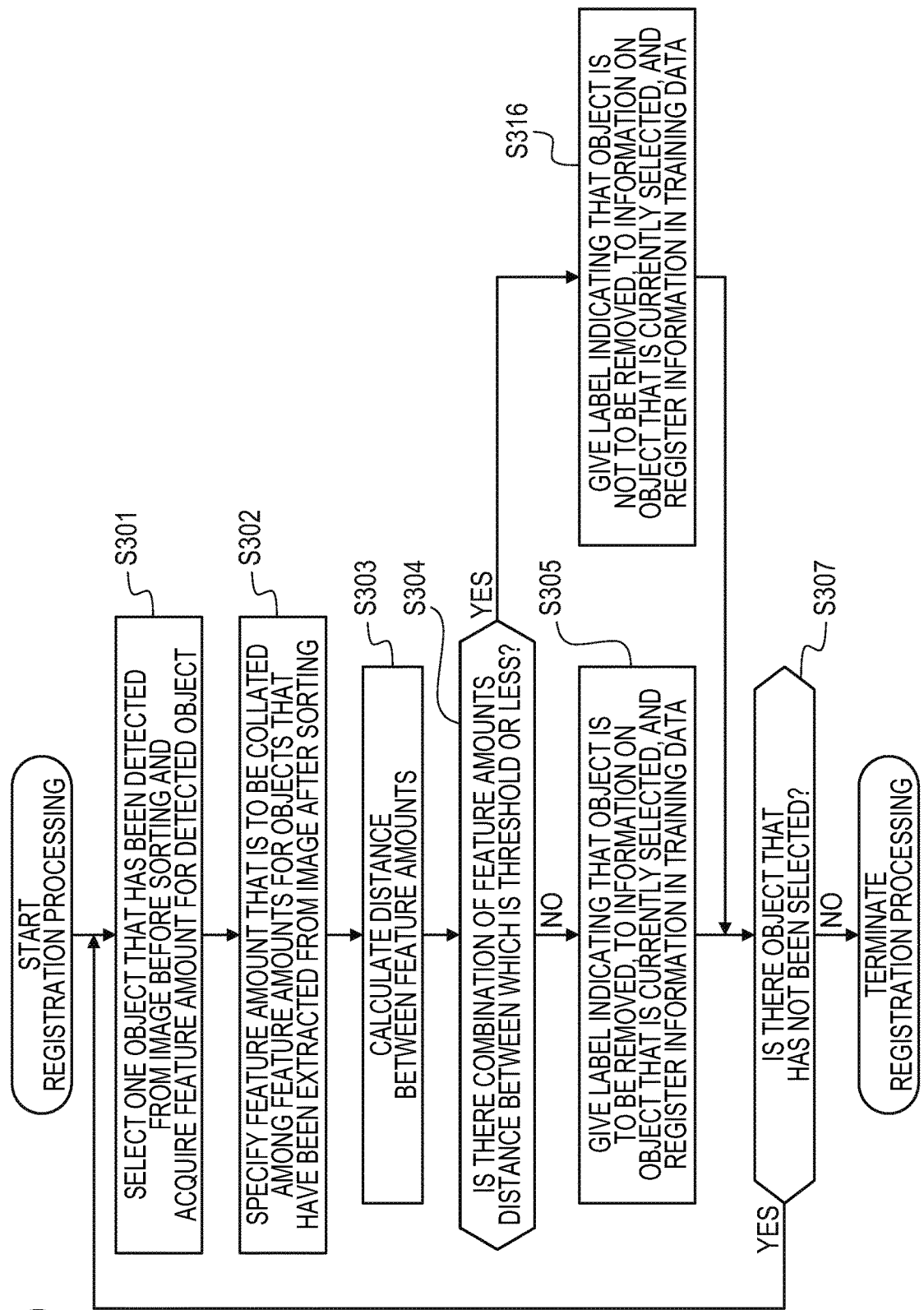
FIG. 10 is a flowchart illustrating a modified example of contents of registration processing.

FIG. 10 is a flowchart illustrating a modified example of contents of registration processing. FIG. 11 is a table illustrating an example of contents of training data that is generated according to the modified example of registration processing.

Processing in accordance with a flowchart of FIG. 10 is performed by the registration unit 130 of the training data generation device 1. The registration unit 130 first performs processing (Steps S301 to S303) of calculating a distance between a feature amount for an object that has been detected from an image before sorting and feature amounts of objects which have been extracted from an image after sorting. Processing of Steps S301 to S303 is performed by the collation unit 131 of the registration unit 130. The collation unit 131 performs processing of Steps S301 to S303, for example, in accordance with the above-described procedures.

When the registration unit 130 terminates processing of Steps S301 to S303, the registration unit 130 next determines whether or not there is a combination of feature amounts for which a distance between the feature amounts has been calculated in Step S303 is the threshold or less (Step S304). Then, when there is not a combination of the feature amounts the distance between which is the threshold or less (NO in Step S304), the registration unit 130 gives information on the object that is currently selected a label indicating that the object is to be removed, and registers the information in the training data 193 (Step S305). On the other hand, when there is a combination of the feature amounts the distance between which is the threshold or less (YES in Step S304), the registration unit 130 gives information on the object that is currently selected a label indicating that the object is not to be removed, and registers the information in the training data 193 (Step S316).

When the registration unit 130 terminates processing of Step S305 and processing of Step S316, the registration unit 130 determines whether or not there is an object that has not been selected among objects that have been detected from the image before sorting (Step S307). When there is an object that has not been selected (YES in Step S307), the registration unit 130 repeats processing of Step S301 and subsequent steps. Then, when the registration unit 130 has performed processing of Step S301 and subsequent steps on all of the objects that are selectable (NO in Step S307), the registration unit 130 terminates registration processing.

As has been described above, the training data generation device 1 may be configured to give information on an object, among objects that have been detected from an image before sorting, which has a feature amount whose distance from feature amounts of objects extracted from an image after sorting is the threshold or less, a label indicating that the object is not to be removed, and register the information in the training data 193. The training data 193 that is generated according to a modified example of the above-described registration processing has, for example, contents illustrated in FIG. 11.

In FIG. 11, an example of the training data 193 that has been generated based on feature amounts of objects, which have been extracted from images of the first image group G1 and the second image group G2 of FIG. 7, is shown. In processing in accordance with the flowchart of FIG. 10, in registering information on an object having feature amounts whose distance is the threshold or less in the training data 193, the registration unit 130 gives the information on the object a label indicating that the object is not to be removed. Therefore, the labels in the training data 193 are two types of labels, that is, a label indicating that an object is to be removed and a label indicating that an object is not to be removed.

In mechanizing (automating) object sorting work using the training data 193, for example, there is a case where it is preferable that information on an object that is to be removed at the time of sorting work is known. The training data generation device 1 that generates training data used for such sorting work may be configured to perform processing in accordance with the flowchart illustrated in FIG. 5 and generate the training data 193 in which information on an object that is to be removed is provided with a label indicating that the object is to be removed. Also, there is a case in which, in sorting work using the training data 193, it is desired to determine, for each object, whether the object is to be removed or not. The training data generation device 1 that generates training data used for such sorting work is configured to perform processing in accordance with the flowchart of FIG. 10 as registration processing (Step S3).

Also, information indicated by a label that is given to information on an object is not limited to information indicating whether or not the object is to be removed, but may be some other information. Also, information on an object, which is registered in the training data 193, is not limited to an image file name but may be a feature amount for the object, which has been extracted from an image.

FIGS. 12A and 12B are tables illustrating another example of training data.

In FIG. 12A, another example of information indicated by a label of the training data 193 is illustrated. For example, there is a case in which, in a work line 10 of FIG. 1, the worker 4 or a device that sorts an object performs work of: sorting each of the plurality of objects 3 that are conveyed by the belt conveyor 2 to a normal product that satisfies a desired condition (standard) or an abnormal product that does not satisfy the condition, and removing the abnormal product. In this case, the training data 193 may be configured, for example, such that labels that are given to information on objects are two types of labels, that is, a label indicating that the object is normal and a label indicating that the object is abnormal. If the labels are information indicating whether an object is a normal product or an abnormal product, for example, the labels may be applied to a work line in which a device that sorts objects removes a normal product from the belt conveyor 2 and lets an abnormal product pass through, without changing the labels in the training data 193.

In FIG. 12B, another example of information on objects that are registered in the training data 193 is illustrated. Information on each of the objects in the training data 193 illustrated in FIG. 12A or the like is information that specifies an image file from which the object has been detected. If the information that specifies the image file has been registered in the training data 193, for example, a device that sorts objects by using the training data 193 is able to appropriately change a feature amount for the object, which is used for sorting. However, if the information that specifies the image file has been registered in the training data 193, each time the device that sorts the objects by using the training data 193 performs sorting of the objects, the device calculates feature amounts of the objects in the training data 193. Therefore, the training data generation device 1 may be configured to, if the feature amount that is used when the training data 193 is used is known, register, as information on an object, the feature amount for the object, which has been extracted from an image, in the training data 193, as illustrated in FIG. 12B. Note that the feature amount for the object, which is to be registered in the training data 193, is not limited to a feature amount that has been calculated by feature amount extraction processing of Step S2 and may be a feature amount that has been separately calculated and is used when the training data 193 is used. Also, although, in FIG. 12B, labels in the training data 193 are two types of labels, that is, a label indicating that an object is a normal product and a label indicating that an object is an abnormal product, the labels are not limited thereto but contents of the labels may be appropriately changed.

Figure 13:
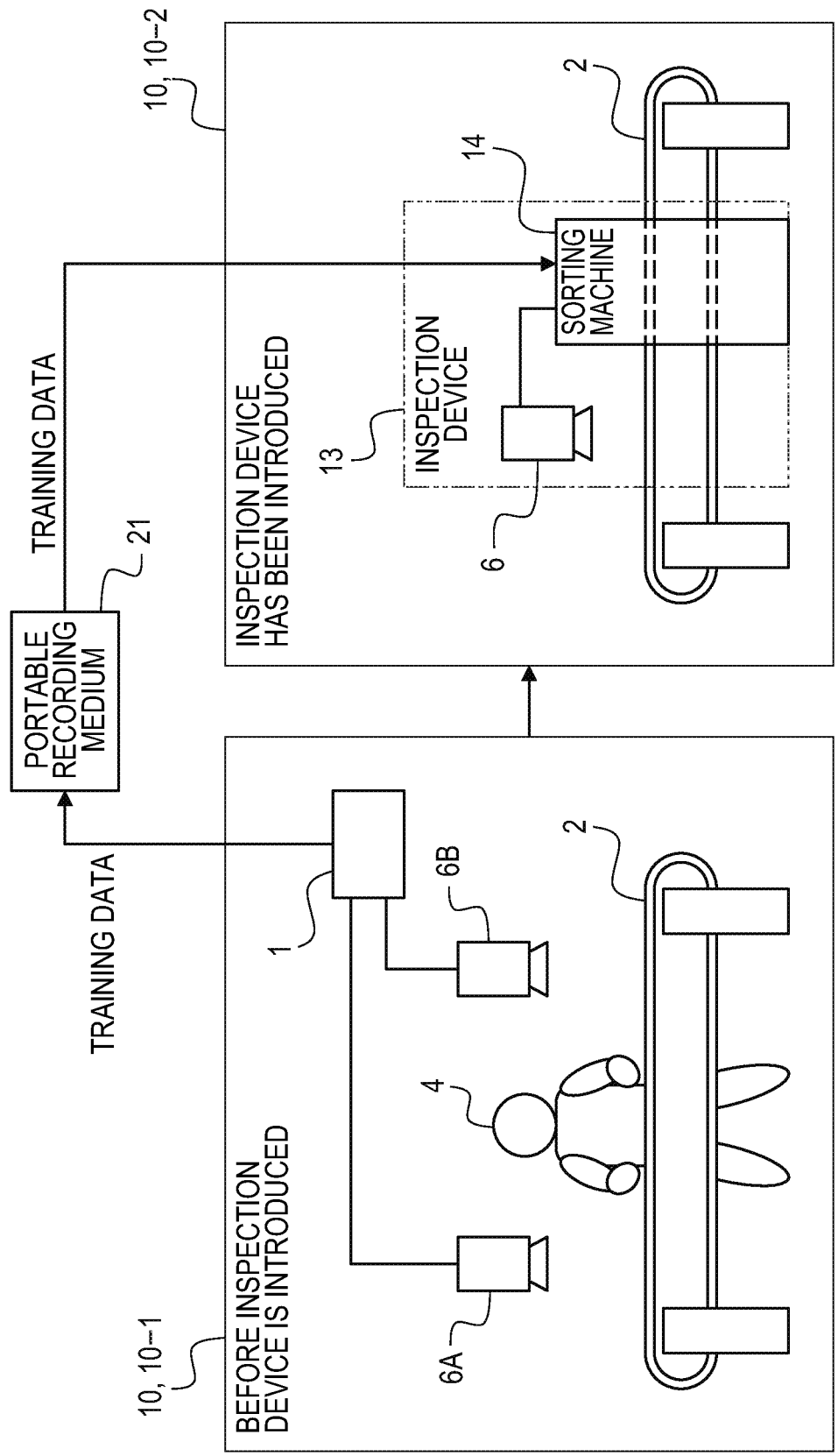
FIG. 13 is a diagram illustrating a first example of a training data utilizing method.

FIG. 13 is a diagram illustrating a first example of a training data utilizing method.

For example, as illustrated in FIG. 13, the training data 193 that has been generated by the training data generation device 1 of the embodiment may be used when an inspection device 13 is introduced to the work line 10 in which the worker 4 performs sorting work to mechanize (automate) sorting work.

In the case, the training data generation device 1 acquires images captured before work of sorting objects is performed by the worker 4 in the work line 10 (10-1) before the inspection device 13 is introduced, and images captured after the work of sorting has been performed. The training data generation device 1 acquires images captured by the first camera 6A located at the left side of the worker 4 in the belt conveyor 2 as images captured before work of sorting objects is performed. Also, the training data generation device 1 acquires images captured by the second camera 6B located at the right side of the worker 4 in the belt conveyor 2 as images captured after the work of sorting has been performed. When the training data generation device 1 completes acquisition (collection) of a predetermined number of images, the training data generation device 1 performs processing of Step S2 and processing of Step S3 to generate the training data 193. For example, the training data 193 that has been generated by the training data generation device 1 is recorded in a portable recording medium 21 and thus stored.

Thereafter, a worker other than the worker 4 removes the first camera 6A and the second camera 6B and installs the inspection device 13 on the conveyance path of the belt conveyor 2 as illustrated in a work line 10 (10-2) on a right side of FIG. 13. The inspection device 13 includes a camera 6 and a sorting machine 14. The camera 6 captures an image of an object on the belt conveyor 2. The sorting machine 14 is a device that determines an object that is to be removed among objects on the belt conveyor 2, based on images captured by the camera 6 and the training data 193, and removes the object from the belt conveyor 2. The sorting machine 14 determines whether or not an object that has been detected from the image captured by the camera 6 is to be removed using the training data 193 that has been recorded in the portable recording medium 21. The sorting machine 14 sorts objects that are to be conveyed by the belt conveyor 2 by removing an object that has been determined to be removed from the belt conveyor 2.

Figure 14:
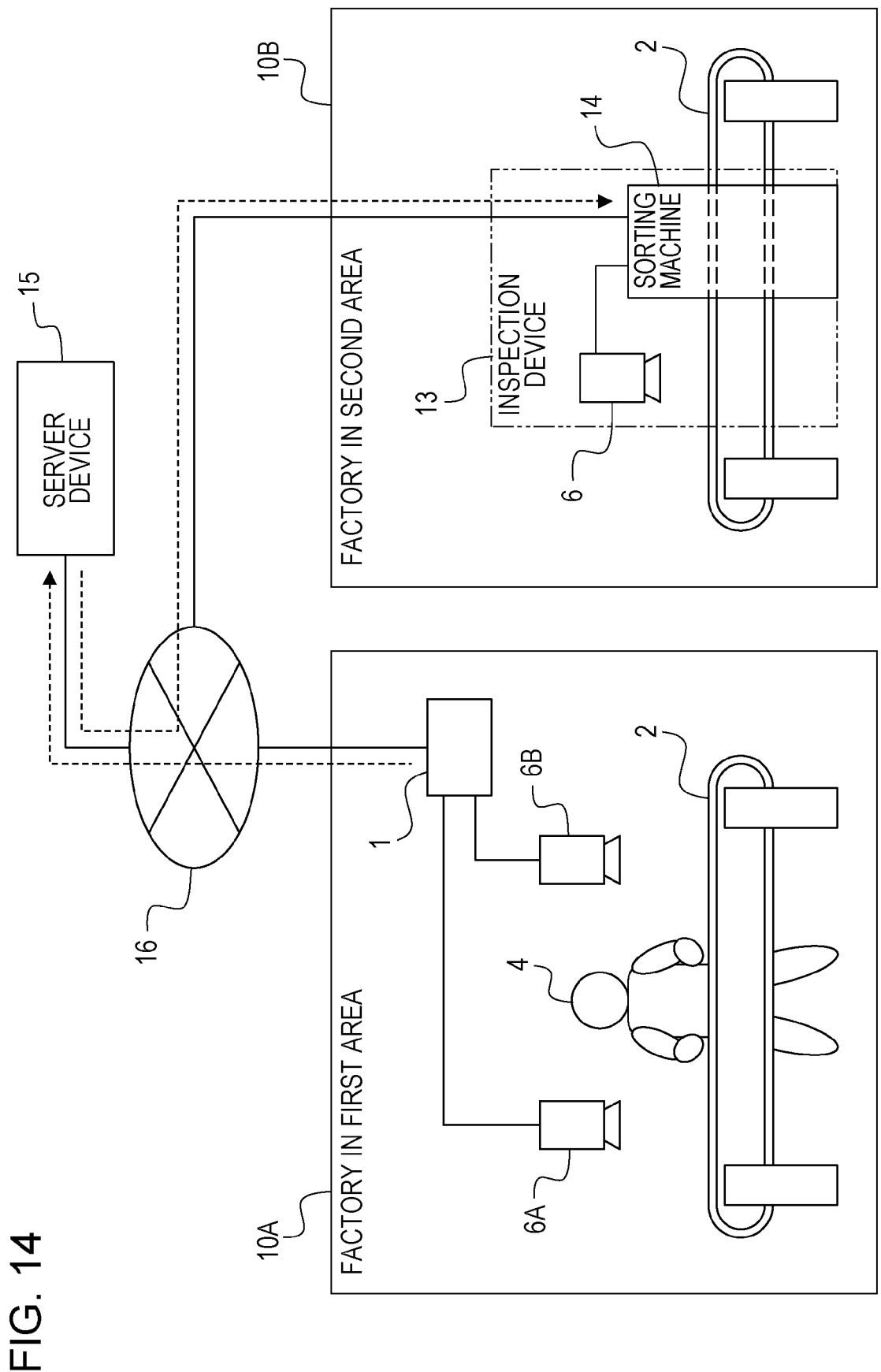
FIG. 14 is a diagram illustrating a second example of a training data utilizing method.

FIG. 14 is a diagram illustrating a second example of a training data utilizing method.

The training data 193 that has been generated by the training data generation device 1 of the embodiment may be used, for example, in a case where, in an area different from an installation area of a work line in which the worker 4 performs sorting work, a mechanized (automated) work line in which the same sorting work is performed is newly installed.

A work line 10A on a left side in FIG. 14 is a work line in operation, which has been installed in a factory in a first area. In the work line 10A, the worker 4 performs sorting work for objects that are conveyed by the belt conveyor 2. On the other hand, a work line 10B on a right side in FIG. 14 is a work line that has been newly installed in a factory in a second area. In the work line 10B, the same sorting work as the sorting work by the worker 4 in the work line 10A is performed by the inspection device 13 including the camera 6 and the sorting machine 14. In such a case, the training data 193 used in the sorting machine 14 of the work line 10B is generated by the work line 10A. That is, the training data generation device 1 acquires images captured before work of sorting objects by the worker 4 is performed in the work line 10A and images captured after the work of sorting has been performed. The training data generation device 1 acquires images captured by the first camera 6A located at the left side of the worker 4 in the belt conveyor 2 as images captured before the work of sorting objects is performed. Also, the training data generation device 1 acquires images captured by the second camera 6B located at the right side of the worker 4 in the belt conveyor 2 as images captured after the sorting work has been performed. When the training data generation device 1 completes acquisition (collection) of a predetermined number of images, the training data generation device 1 performs processing of Step S2 and processing of Step S3 to generate the training data 193. For example, the training data generation device 1 transmits the generated training data 193 to a server device 15. In the case, for example, the output unit 140 of the training data generation device 1 is configured to include a communication function enabling connection to a network 16, such as the Internet or the like. Thus, it is possible to transmit the training data 193 that has been generated by the training data generation device 1 to the server device 15 via the network 16.

On the other hand, in the work line 10B in the factory in the second area, the worker installs the inspection device 13 including the belt conveyor 2 that conveys objects, the camera 6, and the sorting machine 14, and also introduces training data into the sorting machine 14. The sorting machine 14 includes, for example, a communication function enabling connection to the network 16 and acquires the training data 193 from the server device 15 via the network 16. The sorting machine 14 determines whether or not an object that has been detected from the image captured by the camera 6 is to be removed by using the training data 193 that has been acquired from the server device 15. The sorting machine 14 sorts objects that are to conveyed by the belt conveyor 2 by removing an object that has been determined to be removed from the belt conveyor 2.

As described above, the training data 193 may be used not only in a case where the work line 10 used for collecting images is mechanized (automated) but also in some other work line which has been mechanized and in which the same sorting work is performed.

Also, for example, when the objects 3 that are sorting targets are fresh foods, features such as an outer shape and a color, change depending on a season or an area of production. Therefore, for example, the training data 193 may be regularly generated in the work line 10A in the factory of the first area of FIG. 14, and the generated training data 193 may be transmitted to the sorting machine 14 or the like of the factory of the second area.

Note that FIG. 14 illustrates an example in which the training data generation device 1 is installed in the work line 10A and the training data 193 is generated. As illustrated in FIG. 14, if various types of information including the training data 193 are able to be transferred using the network 16, for example, some or all of functions included in the training data generation device 1 may be included in the server device 15. For example, a device that acquires images captured by the first camera 6A and images captured by the second camera 6B may be an information processing device including the image acquisition unit 110, the feature amount extraction unit 120, and an output unit 140. In this case, the information processing device transmits a feature amount that has been extracted by the feature amount extraction unit 120 to the server device 15 including the registration unit 130. The server device 15 generates the training data 193, based on the feature amounts that have been received from the information processing device.

Figure 15:
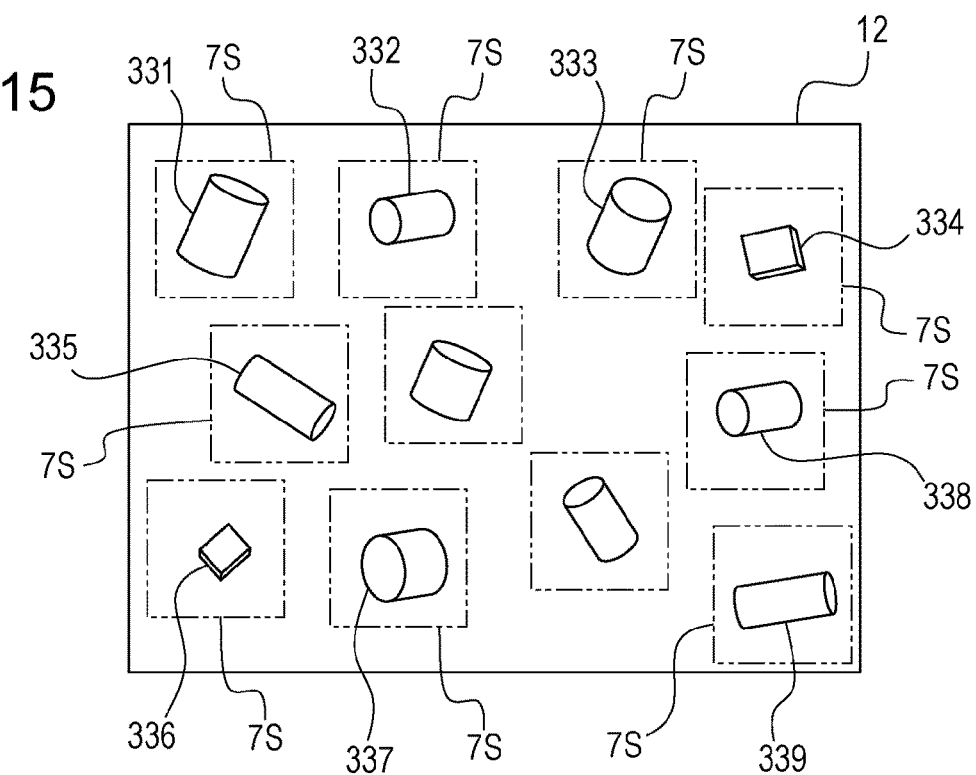
FIG. 15 is a diagram illustrating another example of images that are acquired.

FIG. 15 is a diagram illustrating another example of images that are acquired.

In each of FIG. 6A to FIG. 6E and FIG. 7, in capturing an image before sorting and an image after sorting, a plurality of objects is conveyed in intervals in which capturing is performed such that only a single object exists in each of the images. However, for example, as illustrated in FIG. 15, the image before sorting and the image after sorting may be images captured in a state in which a plurality of objects 331 to 339 is included in a single image 12. When the plurality of objects 331 to 339 is included in the single image 12, the feature amount extraction unit 120 detects the plurality of objects 331 to 339 from the single image 12 and calculates a feature amount for each of the objects that have been detected. In this case, for each of the objects that have been detected, the feature amount extraction unit 120 specifies a predetermined area 7S including the object located at a center thereof, and calculates a feature amount for the object, based on information of a partial image in the area 7S. Also, the feature amount extraction unit 120 allocates different object IDs to the plurality of objects 331 to 339 that have been detected from the single image 12, respectively, and stores imaging times, feature amounts, or the like thereof in the feature amount table 192. In the case, for example, a plurality of objects, whose imaging times are the same and whose feature amounts are different, are registered in a single image group (for example, the first image group G1) in the feature amount table 192 of FIG. 8.

Note that the image 12 of FIG. 15 is an example of an image before sorting. That is, in generating training data, the training data generation device 1 acquires an image after sorting, in which images of the objects 334 and 336, each not having a cylindrical shape, are removed from images of objects included in the image 12, and extracts respective feature amounts of objects from the image. The training data generation device 1 does not detect the objects 334 and 336 each not having a cylindrical shape from the image after sorting. Therefore, the training data generation device 1 gives information on each of the objects 334 and 336 that have been detected from the image 12 a label indicating that the corresponding object is to be removed, and registers the information in the training data 193.

Also, images that are acquired by the training data generation device 1 of the embodiment may be a first image (an image before sorting) captured at a first timing before work of sorting objects is performed and a second image (an image after sorting) captured at a second timing after the work has been performed. Therefore, the training data generation device 1 may be configure to acquire the image before sorting and the image after sorting which have been captured by a single camera.

Figure 16:
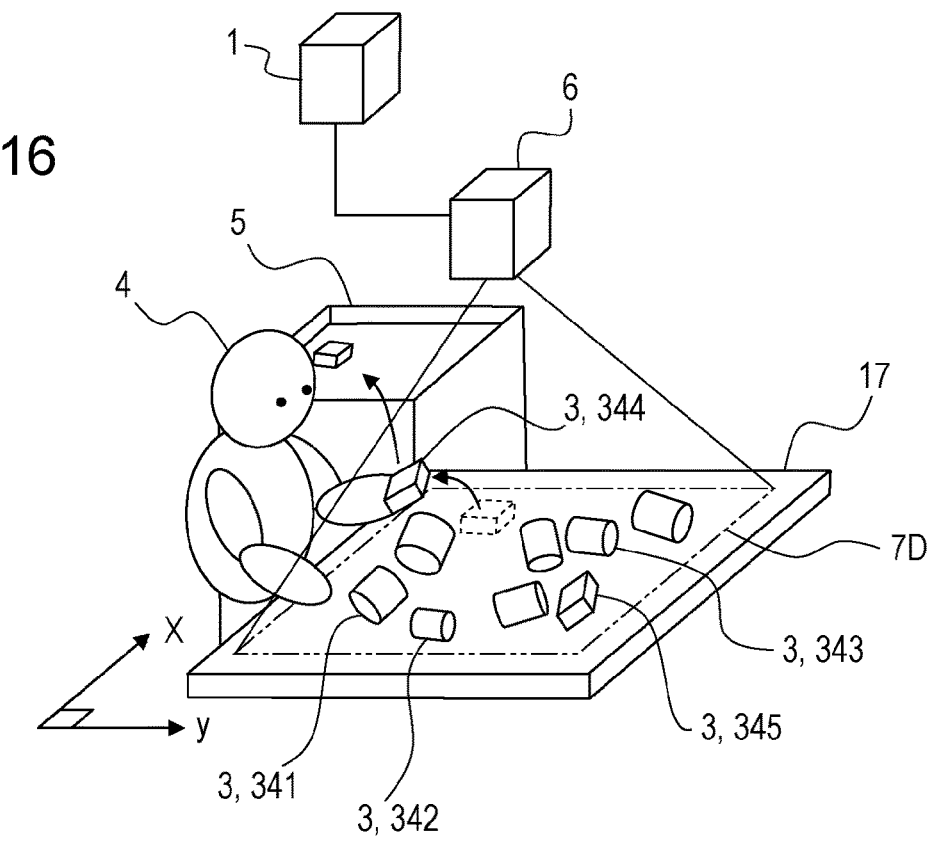
FIG. 16 is a schematic view illustrating another example of an imaging method.

FIG. 16 is a schematic view illustrating another example of a capturing method.

Work of sorting a plurality of objects that are sorting targets to two groups by the worker 4 is not limited to work of sorting objects (moving objects) which are to be conveyed by the belt conveyor 2, but may be, for example, work of sorting a plurality of objects that stand still in a predetermined area, as illustrated in FIG. 16.

FIG. 16 illustrates an example of work of removing objects 344 and 345 each of which does not have a cylindrical outer shape from the plurality of objects 3 (341 to 345) arranged at random on a table 17. In a case in which training data that is used for this type of work is generated, for example, the training data generation device 1 acquires images captured by a single camera 6 installed above the table 17 and generates training data. That is, the training data generation device 1 acquires images of a predetermined imaging area 7D in the table 17, which have been captured by the camera 6 before the worker 4 performs work of sorting objects, and images of the imaging area 7D, which have been captured by the camera 6 after the worker 4 performs the work, and generates training data.

Note that a method for generating the training data 193 described in the embodiment is merely an example of a method for generating training data, based on a first image captured at a first timing before work of sorting objects is performed and a second image captured at a second timing after the work has been performed. For example, in the embodiment, images of a plurality of objects before and after work of sorting the objects that are sorting targets to two groups are used, an image before sorting is the first image, and an image after sorting is the second image. However, in a case in which the training data 193 is generated, the images are not limited thereto but the second image may be an image of the object, which has been captured before sorting. That is, in capturing the image before sorting and the image after sorting, after capturing only objects included in one of the two groups after sorting, objects included in the other one of the two groups may be additionally captured by the worker 4 or the like. In this case, the first image captured at the first timing becomes an image after sorting and the second image captured at the second timing becomes an image before sorting.

Furthermore, the labels in the training data 193 described in the embodiment are an example of information that indicates whether or not an object that has been detected from an image before sorting is an object that is to be removed in sorting work. In other words, the labels in the training data 193 are an example of information that indicates whether the object that has been detected from the image before sorting is an object that exists only in the image before sorting or an object that exits in both of an image before sorting and an image after sorting. Therefore, the labels in the training data 193 may be information with which the two groups after sorting are identified, as described above. That is, the training data 193 may be data that stores a feature amount of an area that corresponds to an object whose image is captured in both of the first image and the second image or a feature amount of an area that corresponds to an object whose image is captured in only one of the first image and the second image.

In addition, in the embodiment, an example in which objects that are sorting targets are sorted to two groups, that is, a group of objects that are to be removed by sorting work and a group of objects that are not to be removed. However, a method for generating the training data 193 according to the embodiment is applicable also to, for example, generation of training data when the objects are sorted to three or more groups by steps of two stages or more.

Figure 17:
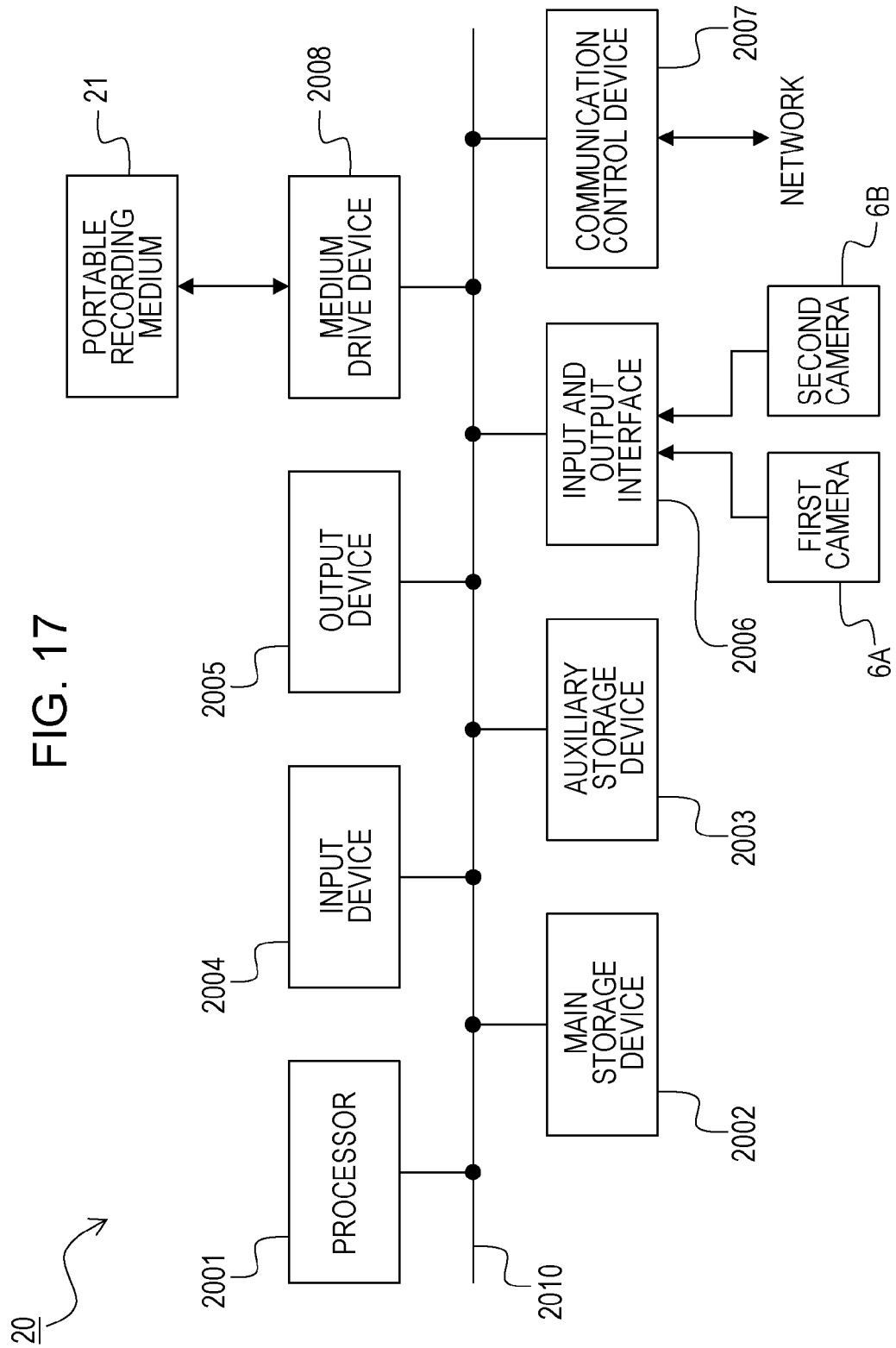
FIG. 17 is a diagram illustrating a hardware configuration of a computer.

The training data generation device 1 described above may be realized by a computer and a program that the computer is caused to execute. With reference to FIG. 17, the training data generation device 1 that is realized by a computer and a program will be described below.

FIG. 17 is a diagram illustrating a hardware configuration of a computer.

As illustrated in FIG. 17, a computer 20 includes a processor 2001, a main storage device 2002, an auxiliary storage device 2003, an input device 2004, an output device 2005, an input and output interface 2006, a communication control device 2007, and a medium drive device 2008. These elements 2001 to 2008 in the computer 20 are mutually coupled via a bus 2010 and are able to exchange data between the elements.

The processor 2001 is a central processing unit (CPU), a micro processing unit (MPU), or the like. The processor 2001 executes various types of programs including an operating system, and thereby, controls an entire operation of the computer 20. Also, the processor 2001 executes, for example, a training data generation program including each processing in the flowcharts of FIG. 3, FIG. 4, and FIG. 5, and thereby, generates the training data 193.

The main storage device 2002 includes a read only memory (ROM) and a random access memory (RAM), which are not illustrated. For example, a predetermined basic control program or the like that is read by the processor 2001 at the time of stating up the computer 20 is recorded in the ROM of the main storage device 2002 in advance. Also, the RAM of the main storage device 2002 is used as a working storage area as appropriate when the processor 2001 executes various types of programs. The RAM of the main storage device 2002 may be used, for example, for storing image data, the feature amount table 192, the training data 193, or the like.

The auxiliary storage device 2003 is a storage device which has a large capacity as compared to the RAM of the main storage device 2002, and examples of the storage device include a hard disk drive (HDD), and an a nonvolatile memory (including a solid state drive (SSD)) such as a flash memory. The auxiliary storage device 2003 may be used for storing various types of programs, various types of data, or the like which are executed by the processor 2001. The auxiliary storage device 2003 may be used, for example, for storing a training data generation program including each processing in the flowcharts of FIG. 3, FIG. 4, and FIG. 5. Also, the auxiliary storage device 2003 may be used, for example, for storing image data, the feature amount table 192, the training data 193, or the like.

The input device 2004 is, for example, a keyboard device, a touch panel device, or the like. When an operator (a user) of the computer 20 performs a predetermined operation on the input device 2004, the input device 2004 transmits input information associated with contents of the operation to the processor 2001. Also, the input device 2004 may be configured to include a camera, such as the first camera 6A, the second camera 6B, or the like. If the input device 2004 includes a camera, for example, image data that is input from the camera may be used for generating the training data 193.

The output device 2005 is, for example, a display device, such as a liquid crystal display device or the like, or a sound reproduction device, such as a speaker or the like.

The input and output interface 2006 couples the computer 20 to some other electronic device. The input and output interface 2006 includes, for example, a connector of a universal serial bus (USB) standard. The input and output interface 2006 may be used, for example, for coupling the computer 20 to each of the first camera 6A and the second camera 6B, or the like.

The communication control device 2007 is a device that couples the computer 20 to a network, such as the Internet or the like, and controls various types of communications between the computer 20 and some other electronic device via the network. The communication control device 2007 may be used, for example, for transmission and reception of training data or the like between the computer 20 and the server device 15.

The medium drive device 2008 reads a program or data that are recorded in the portable recording medium 21 and writes data or the like which has been stored in the auxiliary storage device 2003 to the portable recording medium 21. As the medium drive device 2008, for example, a memory card reader and writer that corresponds to one or more types of standards may be used. If the memory card reader and writer is used as the medium drive device 2008, a memory card of a standard to which the memory card reader and writer corresponds, that is, for example, a memory card (a flash memory) of a Secure Digital (SD) standard or the like, may be used as the portable recording medium 21. Also, as the portable recording medium 21, for example, a flash memory including a connector of a USB standard may be used. Furthermore, if the computer 20 includes an optical disk drive that may be used as the medium drive device 2008, various types of optical disks that may be recognized by the optical disk drive may be used as the portable recording medium 21. As an optical disk that may be used as the portable recording medium 21, for example, a compact disk (CD), a digital versatile disc (DVD), a Blu-ray Disc (registered trademark), or the like may be used. The portable recording medium 21 may be used, for example, for storing a training data generation program including each processing in the flowcharts of FIG. 3, FIG. 4, and FIG. 5. Also, the portable recording medium 21 may be used, for example, for storing image data, the feature amount table 192, the training data 193, or the like.

When the operator inputs a start order for training data generation processing to the computer 20 by using the input device 2004 or the like, the processor 2001 reads and executes a training data program stored in a non-transitory recording medium, such as the auxiliary storage device 2003 or the like. While the training data generation program is executed, the processor 2001 functions (operates) as the image acquisition unit 110, the feature amount extraction unit 120, and the registration unit 130 in the training data generation device 1. Also, while the training data generation program is executed in the computer 20, the RAM of the main storage device 2002 and the auxiliary storage device 2003 function as the storage unit 190 in the training data generation device 1.

Also, after generation of the training data 193 is completed, the computer 20 is able to record the training data 193 in the portable recording medium 21 and thus store the training data 193.

Note that the computer 20 that is caused to operate as the training data generation device 1 may not include all of the elements 2001 to 2008 illustrated in FIG. 17 and some of the elements may be omitted in accordance with use and conditions. For example, the computer 20 may be achieved by omitting the medium drive device 2008 from the elements.

Also, the training data generation program that the computer 20 is caused to execute may be a program including each processing in the flowchart of FIG. 10, instead of each processing in the flowchart of FIG. 5.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory, computer-readable recording medium having stored therein a program for causing a computer to execute a process comprising:
    acquiring a first captured-image that is captured at a first timing before an object-sorting work for sorting a first set of objects is performed, and a second captured-image that is captured at a second timing after the object-sorting work has been performed;
    extracting, from each of the first captured-image and the second captured-image, a feature amount of an object-image that is an image of an object included in each of the first captured-image and the second captured-image;
    storing, in a memory, as training data used for automatically sorting the first set of objects, a first feature amount corresponding to a first object whose object-image is included in both the first captured-image and the second captured-image, or a second feature amount corresponding to a second object whose object-image is included in only one of the first captured-image and the second captured-image; and
    automatically sorting a second set of objects using the training data, wherein
    the first captured-image is captured on an upstream side of a worker position along a conveyance path on which the objects are conveyed, the worker position being a position at which the object-sorting work is performed, and
    the second captured-image is captured on a downstream side of the worker position along the conveyance path.

2. The non-transitory, computer-readable recording medium of claim 1, wherein,
    in the storing, when there exist a pair of feature amounts of a first object-image included in the first captured-image and a second object-image included in the second captured-image, whose difference is equal to or less than a threshold, a feature amount of the first object-image is stored, in the memory, as the first feature amount corresponding to the first object whose object-image is included in both the first image and the second image.

3. The non-transitory, computer-readable recording medium of claim 1, wherein,
    in the storing, a feature amount of an object-image included in the first captured-image is stored, in the memory, in association with information identifying whether the feature amount is the first feature amount corresponding to the first object whose object-image is included in both the first image and the second image or the second feature amount corresponding to the second object whose object-image is included in only one of the first image and the second image.

4. The non-transitory, computer-readable recording medium of claim 1, wherein,
    in the storing, when, for a first object-image included in the first captured image, no object-image having a feature amount whose difference from a feature amount of the first object-image is equal to or less than a threshold is included in the second captured image, the feature amount of the first object-image is stored in the memory as the second feature amount corresponding the second object whose object-image is included only in the first captured image.

5. The non-transitory, computer-readable recording medium of claim 1, wherein, in the storing,
the first feature amount is stored, in the memory, in association with a label indicating that the first object is a normal object, and
the second feature amount is stored, in the memory, in association with a label indicating that the second object is an abnormal object.

6. The non-transitory, computer-readable recording medium of claim 1, wherein, in the acquiring,
the first captured-image is an image in which object-images of a plurality of objects are arranged in a predetermined imaging range, and
the second captured-image is an image in which one or more object-images of the plurality of objects have been removed from the predetermined imaging range.

7. An apparatus comprising:
a memory; and
a processor coupled to the memory and configured to:
acquire a first captured-image that is captured at a first timing before an object-sorting work for sorting a first set of objects is performed, and a second captured-image that is captured at a second timing after the object-sorting work has been performed,
extract, from each of the first captured-image and the second captured-image, a feature amount of an object-image that is an image of an object included in each of the first captured-image and the second captured-image,
store, in the memory, as training data used for automatically sorting the first set of objects, a first feature amount corresponding to a first object whose object-image is included in both the first captured image and the second captured image, or a second feature amount corresponding to a second object whose object-image is included in only one of the first captured-image and the second captured-image, and
automatically store a second set of objects using the training data, wherein
the first captured-image is captured on an upstream side of a worker position along a conveyance path on which the objects are conveyed, the worker position being a position at which the object-sorting work is performed, and
the second captured-image is captured on a downstream side of the worker position along the conveyance path.

8. A method comprising:
acquiring a first captured-image that is captured at a first timing before an object-sorting work for sorting a first set of objects is performed, and a second captured-image that is captured at a second timing after the object-sorting work has been performed;
extracting, from each of the first captured-image and the second captured-image, a feature amount of an object-image that is an image of an object included in each of the first captured-image and the second captured-image;
storing, in a memory, as training data used for automatically sorting the objects, a first feature amount corresponding to a first object whose object-image is included in both the first captured-image and the second captured-image, or a second feature amount corresponding to a second object whose object-image is included in only one of the first captured-image and the second captured-image; and
automatically sorting a second set of objects using the training data, wherein
the first captured-image is captured on an upstream side of a worker position along a conveyance path on which the objects are conveyed, the worker position being a position at which the object-sorting work is performed, and
the second captured-image is captured on a downstream side of the worker position along the conveyance path.

* * * * *